(12) United States Patent
Wang

(10) Patent No.: US 12,306,381 B2
(45) Date of Patent: *May 20, 2025

(54) CAMERA LENS ASSEMBLY COMPRISING FOUR LENSES OF +−++, ++−+ OR +−−+ REGRACTIVE POWERS

(71) Applicant: Zhejiang Sunny Optical Co., Ltd, Ningbo (CN)

(72) Inventor: Xinquan Wang, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/535,294

(22) Filed: Nov. 24, 2021

(65) Prior Publication Data

US 2022/0137334 A1 May 5, 2022

Related U.S. Application Data

(62) Division of application No. 15/778,665, filed as application No. PCT/CN2017/093502 on Jul. 19, 2017, now Pat. No. 11,280,981.

(30) Foreign Application Priority Data

Mar. 30, 2017 (CN) .......................... 201710202841.4
Mar. 30, 2017 (CN) .......................... 201720325753.9

(51) Int. Cl.
*G02B 13/00* (2006.01)
*G02B 9/34* (2006.01)
*G02B 9/44* (2006.01)

(52) U.S. Cl.
CPC ............. *G02B 13/004* (2013.01); *G02B 9/34* (2013.01); *G02B 9/44* (2013.01)

(58) Field of Classification Search
CPC ........... G02B 13/004; G02B 9/44; G02B 9/34
See application file for complete search history.

(56) References Cited

U.S. PATENT DOCUMENTS

| 6,717,748 | B2 | 4/2004 | Sato |
| 8,179,616 | B1 * | 5/2012 | Hsu .......................... G02B 9/34 |
| | | | 359/781 |
| 9,563,036 | B2 | 2/2017 | Liao et al. |
| 9,599,790 | B2 | 3/2017 | Liao et al. |
| 2014/0049838 | A1 | 2/2014 | Tang et al. |
| 2014/0226222 | A1 | 8/2014 | Hsieh et al. |

(Continued)

FOREIGN PATENT DOCUMENTS

| CN | 201984202 U | 9/2011 |
| CN | 106680976 A | 5/2017 |

*Primary Examiner* — Wen Huang
(74) *Attorney, Agent, or Firm* — Sughrue Mion, PLLC

(57) ABSTRACT

The present disclosure discloses a camera lens assembly, the camera lens assembly having a total effective focal length f and an entrance pupil diameter EPD, and along an optical axis from an object side to an image side sequentially including a first lens, a second lens, a third lens and a fourth lens, wherein the first lens and the fourth lens have positive refractive powers, an image-side surface of the first lens is a concave surface, and an object-side surface of the fourth lens is a convex surface. In addition, the total effective focal length f and the entrance pupil diameter EPD satisfy: f/EPD≤2.

7 Claims, 19 Drawing Sheets

(56) References Cited

U.S. PATENT DOCUMENTS

| | | | |
|---|---|---|---|
| 2014/0253782 A1* | 9/2014 | Tsai | H04N 23/55 |
| | | | 359/708 |
| 2014/0254029 A1* | 9/2014 | Hsu | G02B 13/18 |
| | | | 359/713 |
| 2016/0154216 A1 | 6/2016 | Liao et al. | |
| 2016/0161707 A1 | 6/2016 | Liao et al. | |
| 2016/0212353 A1 | 7/2016 | Liu et al. | |
| 2018/0172952 A1 | 1/2018 | Liu | |
| 2018/0188482 A1* | 7/2018 | Jhang | G02B 9/64 |

* cited by examiner

CAMERA LENS ASSEMBLY COMPRISING FOUR LENSES OF +−++, ++−+ OR +−−+ REGRACTIVE POWERS

CROSS-REFERENCE TO RELATED APPLICATIONS

This application claims the priorities and rights of Chinese Patent Application No. 201710202841.4 filed with the State Intellectual Property Office of China (SIPO) on Mar. 30, 2017 and Chinese Patent Application No. 201720325753.9 filed with the SIPO on Mar. 30, 2017, the disclosures of which are hereby incorporated by reference in their entireties.

TECHNICAL FIELD

The present disclosure relates to a camera lens assembly, and specifically to a camera lens assembly composed of four lenses.

BACKGROUND

Currently, a commonly used photosensitive element for a camera lens assembly is normally a CCD (Charge-Coupled Device) or CMOS (Complementary Metal-Oxide Semiconductor). As the elements such as CCD and CMOS are becoming higher in performance and smaller in size, higher requirements for high image quality and miniaturization are imposed on the counterpart camera lens assembly.

Recently, with the extensive use of laser rangefinder cameras, requirements for lens assemblies suitable for the laser rangefinder cameras have become increasingly strict. Generally, the size volume of the lens assembly in the rangefinder camera is large, resulting in the inability to satisfy the miniaturization requirement. On the other hand, the traditional miniaturized lens assembly has generally a small aperture, and cannot be used on the rangefinder camera.

Therefore, there is a need for a camera lens assembly applicable to the rangefinder camera, having characteristics such as a large aperture, miniaturization and high image quality.

SUMMARY

The technical solution provided by the present disclosure at least partially solves the technical problem described above.

According to an aspect, the present disclosure provides a camera lens assembly, the camera lens assembly having a total effective focal length f and an entrance pupil diameter EPD, and along an optical axis from an object side to an image side sequentially including a first lens, a second lens, a third lens and a fourth lens. The first lens and the fourth lens both have positive refractive powers, an image-side surface of the first lens is a concave surface, and an object-side surface of the fourth lens is a convex surface; and the total effective focal length f and the entrance pupil diameter EPD satisfy: f/EPD≤2.

According to another aspect, the present disclosure further provides a camera lens assembly, the camera lens assembly along an optical axis from an object side to an image side sequentially including a first lens, a second lens, a third lens and a fourth lens. Wherein, the first lens has a positive refractive power, and its image-side surface is a concave surface; the fourth lens has a positive refractive power, and its object-side surface of the fourth lens is a convex surface; and a filter is disposed between the fourth lens and the image side, the filter may be a band-pass filter, a band-pass wavelength λ of the band-pass filter fluctuates based on a wavelength of a used light source, a long wave cut-off wavelength of the band-pass wavelength λ may be 15 nm to 50 nm longer than a longest wavelength of the wavelength of the used light source, and a short wave cut-off wavelength of the band-pass wavelength λ may be 15 nm to 50 nm shorter than a shortest wavelength of the wavelength of the used light source.

In an implementation, an object-side surface of the first lens may be a convex surface, and an image-side surface of the fourth lens may be a concave surface.

In an implementation, a center thickness CT2 of the second lens on the optical axis and a sum of a center thickness ΣCT of the first to fourth lenses on the optical axis may satisfy: 10<CT2*100/ΣCT<16.

In an implementation, an effective focal length f1 of the first lens and the total effective focal length f may satisfy: 1<f1/f<1.9.

In an implementation, half of a diagonal length ImgH of an effective pixel area on an image plane of the camera lens assembly and the total effective focal length f may satisfy: ImgH/f<0.8.

In an implementation, a sum of the center thickness ΣCT of the first to fourth lenses on the optical axis and a distance TTL from the first lens to the image plane on the optical axis may satisfy: ΣCT/TTL<0.5.

In an implementation, a center thickness CT2 of the second lens on the optical axis, a center thickness CT3 of the third lens on the optical axis and a center thickness CT4 of the fourth lens on the optical axis may satisfy: 0.5<(CT2+CT3)ΣCT4<1.6.

In an implementation, a center thickness CT2 of the second lens on the optical axis, and a center thickness CT3 of the third lens on the optical axis may satisfy: 0.5<CT2/CT3<1.

In an implementation, an effective radius DT11 of an object-side surface of the first lens and an effective radius DT22 of an image-side surface of the second lens may satisfy: 0.7<DT11/DT22<1.2.

In an implementation, a distance SAG31 from an intersection of an object-side surface of the third lens and the optical axis to an effective radius vertex of the object-side surface of the third lens on the optical axis, and a distance SAG32 from an intersection of an image-side surface of the third lens and the optical axis to an effective radius vertex of the image-side surface of the third lens on the optical axis may satisfy: 0.5<SAG31/SAG32<1.

In the present disclosure, a plurality of (for example, four) lenses are used, and the camera lens assembly may have at least one of the following advantages by properly arranging the refractive power, surface type of each lens, axial spacing between lenses, etc.: effectively enlarging the aperture of the lens assembly; shortening the total length of the lens assembly; ensuring the effective clear diameter and the miniaturization of the lens assembly; correcting various aberrations; and improving the resolution and the image quality of the lens assembly.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

Figure 1:
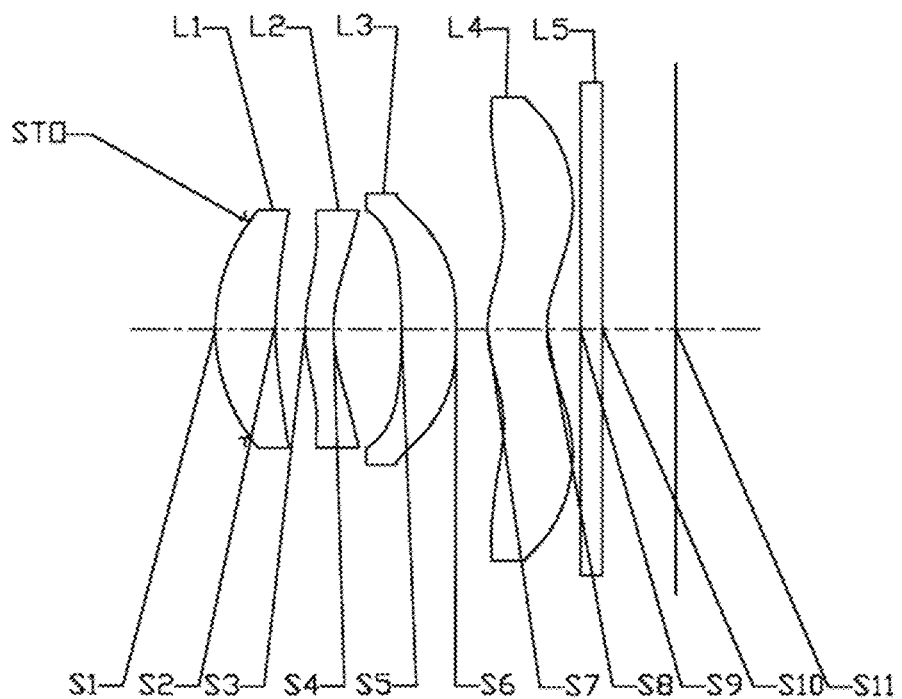
FIG. 1 is a schematic structural view illustrating a camera lens assembly according to embodiment 1 of the present disclosure.

For a better understanding of the present disclosure, various aspects of the present disclosure will be described in more detail with reference to the accompanying drawings. It should be understood that the detailed description is merely illustrative of the exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions of the first, the second, etc. are used only to distinguish one feature from another, without indicating any limitation to the feature. Thus, the first lens discussed below may also be referred to as the second lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having", "containing" and/or "contain", when used in the specification, specify the presence of stated features, unities, steps, operations, elements and/or components, but do not exclude the presence or addition of one or more other features, unities, steps, operations, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

As used herein, the terms "substantially," "about" and similar terms are used as terms of approximation and not as terms indicating degree, and are intended to describe the inherent deviations of a measurement value or a calculation value that will be understood by those of ordinary skill in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The present disclosure will be further described below in combination with specific embodiments.

The camera lens assembly according to exemplary implementations of the present disclosure has, for example, four lenses, i.e., a first lens, a second lens, a third lens and a fourth lens. The four lenses are arranged in sequence from an object side to an image side along an optical axis.

According to an implementation of the present disclosure, the first lens has a positive refractive power, and its image-side surface may be concave. The first lens with the positive refractive power has a large refractive power. Setting the image-side surface of the first lens to be a concave surface is advantageous in shortening the overall length of the camera lens assembly and reducing the size volume of the lens assembly, and achieving the miniaturization of the lens assembly.

As an example, the object-side surface of the first lens may be convex. The first lens with a convex object-side surface has a large refractive power, which is advantageous for shortening the overall length of the camera lens assembly and reducing the size volume of the camera lens assembly. In addition, the focal length of the lens may also be optimized to enhance the performance of the camera lens assembly. For example, the effective focal length f1 of the first lens and the total effective focal length f of the camera lens assembly may satisfy: $1<f1/f<1.9$. When the camera lens assembly according to exemplary implementations of the present disclosure satisfies $1<f1/f<1.9$, the focal length of the first lens may be configured relatively balance, so that the total optical length of the camera lens assembly system may be effectively controlled and the miniaturization of the lens assembly may be achieved. At the same time, such configuration is also advantageous for the first lens to satisfy the requirements of the molding process. Optionally, the effective focal length of the first lens f1 and the total effective focal length f may further satisfy: $1.161 \leq f1/f \leq 1.870$.

The second lens has a refractive power. The second lens with the refractive power may correct a spherical aberration and a coma aberration of the first lens.

The third lens has a refractive power. The third lens with the refractive power may reduce the angle between light and the optical axis of the off-axis field-of-view, thereby improving the astigmatism of the off-axis field-of-view and improving the image quality of the camera lens assembly.

The fourth lens has a positive refractive power, and its object-side surface may be a convex. Configuring the fourth lens to have a positive refractive power facilitates the distribution of the refractive power, thereby improving the light gathering power of the lens assembly and shortening the overall length of the camera lens assembly.

As an example, an image-side surface of the fourth lens may be concave. Setting the image-side surface of the fourth lens as a concave surface is advantageous to increase the chief ray angle of the image plane, thereby facilitating to shortening the overall length of the camera lens assembly and reducing the size volume of the camera lens assembly.

Figure 19:
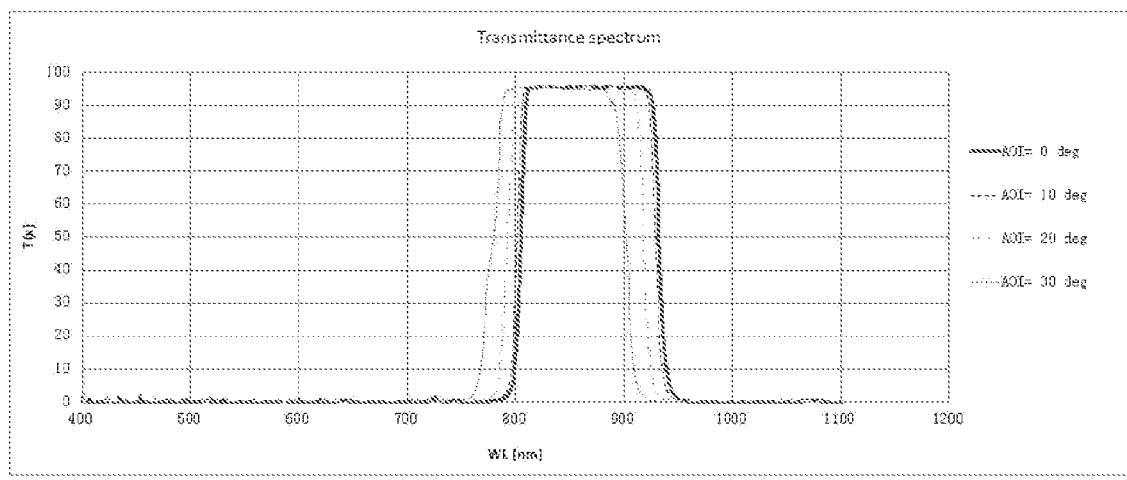
FIG. 19 illustrates a transmittance spectrogram of a filter according to an embodiment of the present disclosure.

Optionally, a filter is disposed between the fourth lens and the image plane, and the filter may be a band-pass filter. FIG. 19 is a transmittance spectrogram of a filter according to an implementation of the present disclosure. As can be seen from the figure, for the band-pass filter, it can pass frequencies within a certain middle range and cut-off the frequencies outside that range. Alternatively, the band-pass wavelength $\lambda$ of the band-pass filter fluctuates based on the wavelength of a used light source, the long wave cut-off wavelength of the band-pass wavelength $\lambda$ is 15 nm to 50 nm longer than the longest wavelength of the wavelength of the used light source, the short wave cut-off wavelength of the band-pass wavelength $\lambda$ is 15 nm to 50 nm shorter than the shortest wavelength of the wavelength of the used light source. Appropriate passage of the infrared band may be beneficial to the system without introducing the influence of the chromatic aberration, and may control the diameter of the diffuse spot. At the same time, the infrared band is conducive to eliminating the interference of the environment visible light, thereby improving the image quality of the lens assembly.

The total effective focal length f and the entrance pupil diameter EPD of the camera lens assembly according to the exemplary implementations of the present disclosure may satisfy: $f/EPD \leq 2$. By properly arranging the total effective focal length f and the entrance pupil diameter EPD, the image plane energy density on the image plane may be effectively increased, which is advantageous to improve the signal-to-noise ratio of the output signal of an image side sensor, i.e., the accuracy of measuring the distance. For example, the total effective focal length f and the entrance pupil diameter EPD may further satisfy: $1.500 \leq f/EPD \leq 1.600$.

In practice, the center thickness of each lens on the optical axis may be optimized. The proper arrangement of the size and structure of each lens in the camera lens assembly is conducive to realizing the compression of the horizontal size of the lens assembly, so as to ensure the miniaturization of the lens assembly. For example, a center thickness CT2 of the second lens on the optical axis and a sum of a center thickness $\Sigma CT$ of the first to fourth lenses on the optical axis may satisfy: $10 < CT2*100/\Sigma CT < 16$, more specifically, CT2 and $\Sigma CT$ may further satisfy: $13.374 \leq CT2*100/\Sigma CT \leq 15.924$. By properly arranging the center thickness CT2 of the second lens on the optical axis and the sum of the center thickness ΣCT of the first to fourth lenses on the optical axis, it is possible to shorten the overall length of the camera lens assembly, at the same time facilitate a better molding of the lens assembly, and avoid molding difficulties. For another example, a center thickness CT2 of the second lens on the optical axis, a center thickness CT3 of the third lens on the optical axis and a center thickness CT4 of the fourth lens on the optical axis may satisfy: 0.5<(CT2+CT3)ΣCT4<1.6, more specifically, CT2, CT3 and CT4 may further satisfy: 0.771≤(CT2+CT3)ΣCT4≤1.561. By properly arranging the center thickness CT2 of the second lens on the optical axis, the center thickness CT3 of the third lens on the optical axis and the center thickness CT4 of the fourth lens on the optical axis, it may be conducive to producing a wider surface-shaped range on the fourth lens, in order to effectively reduce the astigmatism of each field-of-view. Meanwhile, when the camera lens assembly satisfies: 0.5<(CT2+CT3)ΣCT4<1.6, it also facilitates the molding of the second lens, the third lens, and the fourth lens. Another example, a center thickness CT2 of the second lens on the optical axis and a center thickness CT3 of the third lens on the optical axis may satisfy: 0.5<CT2/CT3<1, more specifically, CT2 and CT3 may further satisfy: 0.516≤CT2/CT3≤0.933. Such an arrangement is advantageous for distributing the refractive power of the system mainly on the first lens and the third lens, so as to avoid the generation of large aberration due to excessive concentration of the refractive power. In addition, the second lens disposed in the middle may be used to eliminate the spherical aberration generated by the first lens and the third lens.

According to an implementation of the present disclosure, the sum of the center thickness ΣCT of the first to fourth lenses on the optical axis and a distance TTL from the first lens to the image plane on the optical axis may satisfy: ΣCT/TTL<0.5, more specifically, ΣCT and TTL may further satisfy: 0.422≤ΣCT/TTL≤0.460. When the camera lens assembly satisfies: ΣCT/TTL<0.5, it is conducive to shortening the overall length of the camera lens assembly and realizing the miniaturization of the lens assembly. At the same time, under the circumstance that the overall length of the lens assembly is ensured to be unchanged, appropriately increasing the distance between the lenses is conducive to reducing the tolerance sensitivity of the lens assembly, so as to realizing the quality promotion and the consistency of the lens assembly in the mass production process.

Half of a diagonal length ImgH of an effective pixel area on an image plane of the camera lens assembly and a total effective focal length f of the camera lens assembly may satisfy: ImgH/f<0.8, for example, ImgH and f may further satisfy: 0.753≤ImgH/f≤0.791. By properly arranging half of the diagonal length ImgH of an effective pixel area on an image plane and the total effective focal length f of the camera lens assembly, the energy density of the off-axis field-of-view reaching the image plane may be increased, i.e., improving the accuracy of the distance detection.

In order to ensure the structural stability of the camera lens assembly during the assembly process and avoid the bending deformation caused by the positioning aperture difference between the first lens and the second lens, an effective radius DT11 of the object-side surface of the first lens and an effective radius DT22 of an image-side surface of the second lens may be configured to satisfy: 0.7<DT11/DT22<1.2, more specifically, DT11 and DT22 may further satisfy: 0.847≤DT11/DT22≤1.041.

According to an implementation of the present disclosure, a distance SAG31 from an intersection of an object-side surface of the third lens and the optical axis to an effective radius vertex of the object-side surface of the third lens on the optical axis, and a distance SAG32 from an intersection of an image-side surface of the third lens and the optical axis to an effective radius vertex of the image side surface of the third lens on the optical axis may satisfy: 0.5<SAG31/SAG32<1. The third lens satisfying 0.5<SAG31/SAG32<1 has a greater refractive power to the off-axis field-of-view, which is conducive to shortening the overall length of the camera lens assembly. At the same time, such an arrangement is also conducive to improving the astigmatism of the off-axis field-of-view, reducing the ray angle of the off-axis field-of-view, and improving the image quality.

The camera lens assembly according to the exemplary implementations of the present disclosure may use a plurality of lenses, for example, four as used in the present disclosure. By properly distributing the refractive power, surface type of each lens, axial spacing between lenses and the like, it is possible to effectively increase the effective clear diameter of the camera lens assembly, ensure the miniaturization of the lens assembly and improve the image quality, thus making the camera lens assembly more conducive to production and processing and may be applicable to such as laser rangefinder cameras. In the implementations of the present disclosure, at least one of the mirror surfaces of each lens is an aspheric mirror surface. The feature of the aspheric lens is: from the center of the lens to the periphery, the curvature is continuously changing. Unlike the spherical lens with a certain curvature from the center of the lens to the edge, the aspheric lens has a better curvature radius characteristic, which will be advantageous for improving the distortion aberration and improving the astigmatism aberration, and can make the field-of-view larger and more realistic. Using the aspheric lens, the aberration occurred at the time of imaging can be eliminated as much as possible, thereby improving the image quality.

However, it should be understood by those skilled in the art that the various results and advantages described in this specification may be obtained by changing the constituting numbers of the lens assemblies without departing from the technical solution claimed by the present disclosure. For example, although four lenses are described as an example in the implementation, the camera lens assembly is not limited to including four lenses. If desired, the camera lens assembly may also include other numbers of lenses.

Specific embodiments of the camera lens assembly that may be applied to the above-described implementations are further described below with reference to the accompanying drawings.

Embodiment 1

The camera lens assembly according to embodiment 1 of the present disclosure is described below with reference to FIG. 1 to FIG. 2D. FIG. 1 shows a schematic structural view of a camera lens assembly according to embodiment 1 of the present disclosure.

As shown in FIG. 1, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust the amount of light entering. Light from an object passes through the surfaces S1 to S10 successively and is finally imaged on the image plane S11.

Table 1 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 1.

TABLE 1

| | Parameter | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| Value 2.530 | 36.276 | 3.319 | 5.554 | −165.453 | 55.270 | 7.054 | 4.385 |

Available from Table 1, the effective focal length f1 of the first lens L1 and the total effective focal length f of the camera lens assembly satisfy: f1/f=1.673. Half of the diagonal length ImgH of an effective pixel area on the image plane S11 of the camera lens assembly and the total effective focal length f of the camera lens assembly satisfy: ImgH/f=0.762.

Table 2 shows the surface type, the radius of curvature, the thickness, the material and the conic coefficient of each lens of the camera lens assembly in embodiment 1, wherein the units for the radius of curvature and the thickness are millimeter (mm).

Available from Table 2, the center thickness CT2 of the second lens L2 on the optical axis and the sum of the center thickness ΣCT of the first to fourth lenses L1-L4 on the optical axis satisfy: CT2*100/ΣCT=13.966. The center thickness CT2 of the second lens L2 on the optical axis and the center thickness CT3 of the third lens L3 on the optical axis satisfy: CT2/CT3=0.516. The center thickness CT2 of the second lens L2 on the optical axis, the center thickness CT3 of the third lens L3 on the optical axis and the center thickness CT4 of the fourth lens L4 on the optical axis satisfy: (CT2+CT3)ΣCT4=1.402. Combining Table 1 with Table 2 it can be obtained that the sum of the center thickness ΣCT of the first to fourth lenses L1-L4 on the optical axis, and the distance TTL from the object-side surface S1 of the first lens L1 to the image plane S11 on the optical axis satisfy: ΣCT/TTL=0.441.

In this embodiment, four lenses are used as an example. By properly arranging the focal length and the surface type of each lens, the aperture of the lens assembly is effectively enlarged, the total length of the lens assembly is shortened, and the effective clear diameter and the miniaturization of the lens assembly is ensured. At the same time, correcting various aberrations and improving the resolution and the image quality of the lens assembly. The surface type x of each aspheric surface is defined by the following formula:

$$x = \frac{ch^2}{1+\sqrt{1-(k+1)c^2h^2}} + \Sigma A_i h^i \quad (1)$$

Here, x is the sag—the axis-component of the displacement of the surface from the aspheric vertex, when the surface is at height h from the optical axis; c is the paraxial curvature of the aspheric surface, c=1/r (i.e., the paraxial curvature c is the reciprocal of the curvature radius r in the above Table 2); k is the conic constant (given in the above Table 2); and $A_i$ is the correction coefficient of the $i^{th}$ order of the aspheric surface. Table 3 below shows higher-order coefficients $A_4, A_6, A_8, A_{10}, A_{12}, A_{14}, A_{16}$ applicable to each aspheric mirror surface S1 to S8 in embodiment 1.

TABLE 2

| Surface number | Surface type | Radius of curvature | Thickness | Material | | Conic coefficient |
|---|---|---|---|---|---|---|
| | | | | Refraction index | Abbe number | |
| OBJ | spherical | infinite | 400.0000 | | | |
| STO | spherical | infinite | −0.2800 | | | |
| S1 | aspheric | 1.7605 | 0.5734 | 1.640 | 23.53 | −0.3606 |
| S2 | aspheric | 3.1512 | 0.2813 | | | −29.1999 |
| S3 | aspheric | 1.5262 | 0.2700 | 1.535 | 55.78 | −2.0726 |
| S4 | aspheric | 1.4083 | 0.6462 | | | 0.3627 |
| S5 | aspheric | −7.1447 | 0.5238 | 1.535 | 55.78 | 0.0000 |
| S6 | aspheric | −5.8839 | 0.2957 | | | 16.2051 |
| S7 | aspheric | 0.9761 | 0.5661 | 1.535 | 55.78 | −5.1721 |
| S8 | aspheric | 1.0581 | 0.3185 | | | −1.0049 |
| S9 | spherical | infinite | 0.2100 | 1.517 | 64.17 | |
| S10 | spherical | infinite | 0.7000 | | | |
| S11 | spherical | infinite | | | | |

TABLE 3

| Surface number | A4 | A6 | A8 | A10 | A12 | A14 | A16 |
|---|---|---|---|---|---|---|---|
| S1 | −5.9516E−03 | 1.9852E−02 | −1.5871E−02 | 1.5864E−02 | −1.6813E−02 | 1.2252E−02 | −3.4575E−03 |
| S2 | 9.2490E−03 | −2.6510E−02 | 1.0587E−02 | 1.1879E−02 | −8.8590E−03 | −1.7656E−03 | 2.7792E−03 |
| S3 | −2.2059E−01 | 4.0162E−02 | −1.4645E−01 | 2.0486E−01 | −4.7405E−02 | −4.1791E−02 | 2.0402E−02 |
| S4 | −2.2081E−01 | −1.3525E−02 | −1.1770E−01 | 2.4574E−01 | −1.9188E−01 | 6.4003E−02 | −1.1656E−02 |
| S5 | −5.5771E−02 | −9.3840E−02 | 2.5995E−01 | −4.8612E−01 | 3.6437E−01 | −8.9587E−02 | −1.0212E−02 |
| S6 | −5.9902E−01 | 1.1052E+00 | −1.6080E+00 | 1.5575E+00 | −9.4567E−01 | 3.1661E−01 | −4.1811E−02 |
| S7 | −2.0821E−01 | 2.9965E−02 | 3.9309E−02 | −2.0989E−02 | 4.4291E−03 | −4.3208E−04 | 1.5934E−05 |
| S8 | −3.6232E−01 | 1.7121E−01 | −6.3113E−02 | 1.5460E−02 | −2.1025E−03 | 1.0794E−04 | 1.5997E−06 |

In this embodiment, the effective radius DT11 of the object-side surface S1 of the first lens L1 and the effective radius DT22 of the image-side surface S4 of the second lens L2 satisfy: DT11/DT22=1.011. The distance SAG31 from an intersection of the object-side surface S5 of the third lens L3 and the optical axis to the effective radius vertex of the object-side surface S5 of the third lens L3 on the optical axis, and the distance SAG32 from an intersection of the image-side surface S6 of the third lens L3 and the optical axis to the effective radius vertex of the image-side surface S6 of the third lens L3 on the optical axis satisfy: SAG31/SAG32=0.580. In addition, the total effective focal length f of the camera lens and the entrance pupil diameter EPD of the camera lens assembly satisfy: f/EPD=1.595.

Figure 2A:
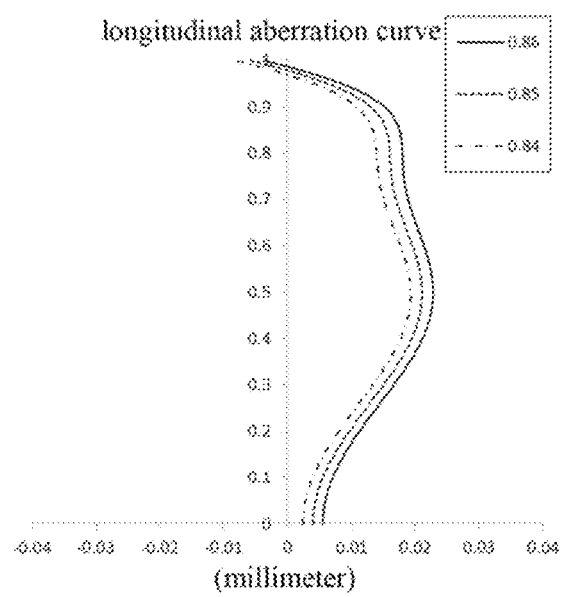
FIG. 2A illustrates a longitudinal aberration curve of the camera lens assembly according to embodiment 1.
Figure 2B:
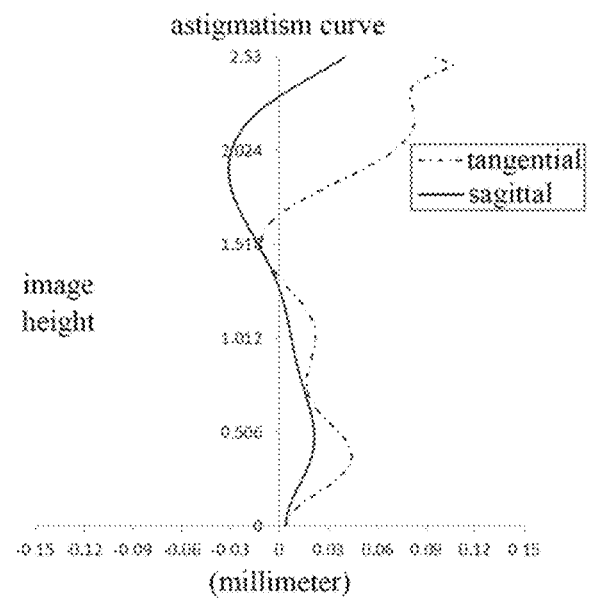
FIG. 2B illustrates an astigmatism curve of the camera lens assembly according to embodiment 1.
Figure 2C:
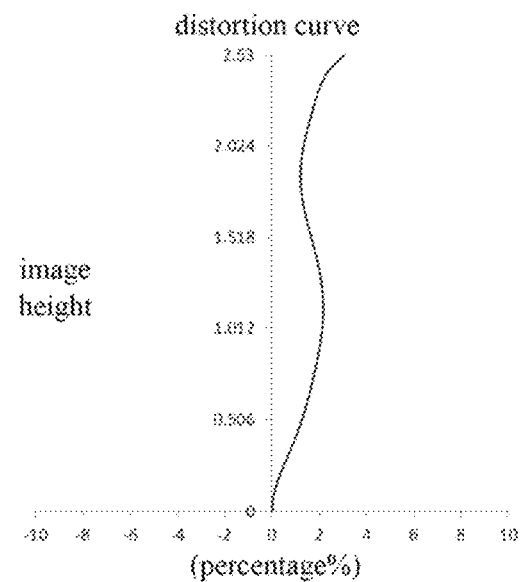
FIG. 2C illustrates a distortion curve of the camera lens assembly according to embodiment 1.
Figure 2D:
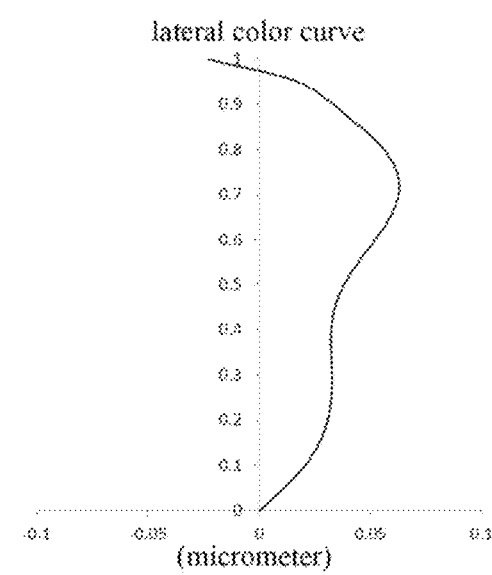
FIG. 2D illustrates a lateral color curve of the camera lens assembly according to embodiment 1.

FIG. 2A shows a longitudinal aberration curve of the camera lens assembly according to embodiment 1, representing deviations of focal points of light in different wavelengths converged after passing through the optical system. FIG. 2B shows an astigmatism curve of the camera lens assembly according to embodiment 1, representing a curvature of a tangential plane and a curvature of a sagittal plane. FIG. 2C shows a distortion curve of the camera lens assembly according to embodiment 1, representing amounts of distortion at different viewing angles. FIG. 2D shows a lateral color curve of the camera lens assembly according to embodiment 1, representing deviations of different image heights on the image plane after light passes through the camera lens assembly. It can be seen from FIG. 2A to FIG. 2D that the camera lens assembly according to embodiment 1 can achieve good image quality.

Embodiment 2

Figure 3:
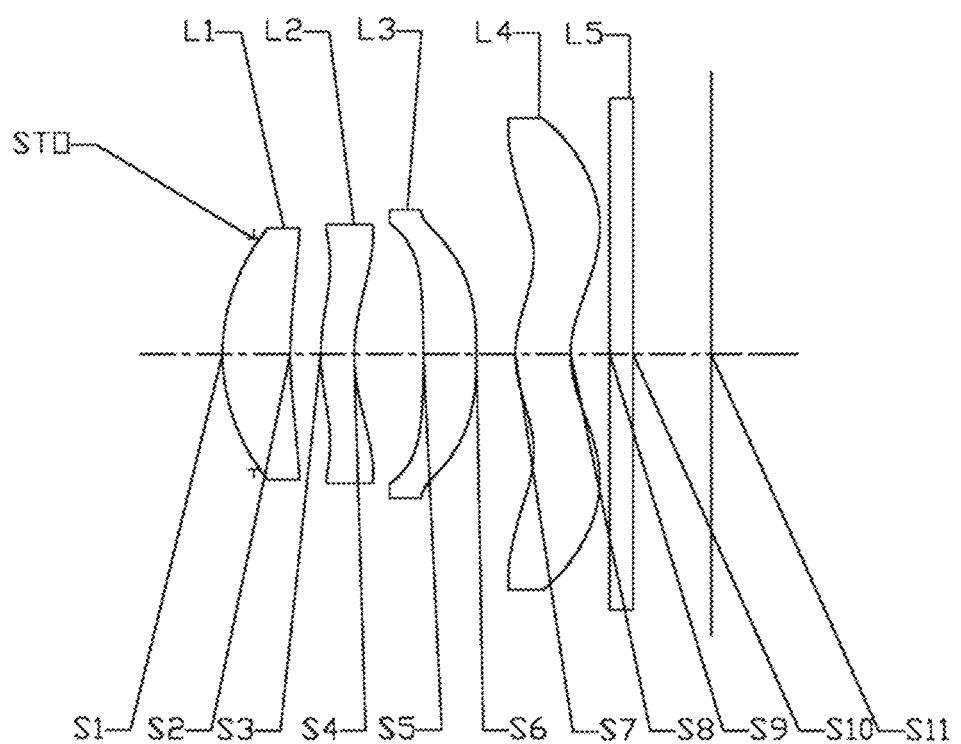
FIG. 3 is a schematic structural view illustrating a camera lens assembly according to embodiment 2 of the present disclosure.

The camera lens assembly according to embodiment 2 of the present disclosure is described below with reference to FIG. 3 to FIG. 4D. For the purpose of brevity, the description of parts similar to those in embodiment 1 will be omitted in the present embodiment and the embodiments below. FIG. 3 is a schematic structural view illustrating a camera lens assembly according to embodiment 2 of the present disclosure.

As shown in FIG. 3, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust the amount of light entering. Light from an object passes through the surfaces S1 to S10 successively and is finally imaged on the image plane S11.

Table 4 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 2. Table 5 shows the surface type, the radius of curvature, the thickness, the material and the conic coefficient of each lens of the camera lens assembly in embodiment 2, wherein the unit for the radius of curvature and the thickness is millimeter (mm). Table 6 shows higher-order coefficients $A_4, A_6, A_8, A_{10}, A_{12}, A_{14}, A_{16}$ applicable to each aspheric mirror surface S1 to S8 in embodiment 2. Here, the respective aspheric surface type may be defined by the formula 1) given in the above embodiment 1.

TABLE 4

| Parameter | | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| 2.530 | 36.290 | 3.323 | 5.555 | −54.824 | 17.909 | 9.213 | 4.385 |

TABLE 5

| Surface number | Surface type | Radius of curvature | Thickness | Material | | Conic coefficient |
|---|---|---|---|---|---|---|
| | | | | Refraction index | Abbe number | |
| OBJ | spherical | infinite | 400.0000 | | | |
| STO | spherical | infinite | −0.2800 | | | |

TABLE 5-continued

| Surface number | Surface type | Radius of curvature | Thickness | Material Refraction index | Abbe number | Conic coefficient |
|---|---|---|---|---|---|---|
| S1 | aspheric | 1.7382 | 0.6092 | 1.544 | 56.11 | −0.4343 |
| S2 | aspheric | 3.6640 | 0.2733 | | | −43.6515 |
| S3 | aspheric | 1.7489 | 0.2998 | 1.544 | 56.11 | −3.2541 |
| S4 | aspheric | 1.5519 | 0.6205 | | | 0.5571 |
| S5 | aspheric | −14.3307 | 0.4765 | 1.544 | 56.11 | 0.0000 |
| S6 | aspheric | −5.8162 | 0.3484 | | | 17.4503 |
| S7 | aspheric | 0.9451 | 0.4973 | 1.544 | 56.11 | −4.6157 |
| S8 | aspheric | 0.9542 | 0.3502 | | | −1.1562 |
| S9 | spherical | infinite | 0.2100 | 1.517 | 64.17 | |
| S10 | spherical | infinite | 0.7000 | | | |
| S11 | spherical | infinite | | | | |

TABLE 6

| Surface number | A4 | A6 | A8 | A10 | A12 | A14 | A16 |
|---|---|---|---|---|---|---|---|
| S1 | −4.2462E−03 | 1.8503E−02 | −1.7356E−02 | 1.6929E−02 | −1.5494E−02 | 1.1631E−02 | −3.8976E−03 |
| S2 | −9.4233E−03 | −2.3287E−02 | 1.3937E−02 | 1.1626E−02 | −7.2996E−03 | −4.5278E−03 | 2.8197E−03 |
| S3 | −2.1532E−01 | 4.8414E−02 | −1.3022E−01 | 2.0156E−01 | −6.2803E−02 | −4.5414E−02 | 2.5492E−02 |
| S4 | −2.2892E−01 | 1.6775E−02 | −1.2576E−01 | 2.4282E−01 | −1.9454E−01 | 6.2032E−02 | −9.0975E−03 |
| S5 | −4.1731E−02 | −1.0799E−01 | 2.8320E−01 | −5.0809E−01 | 3.5933E−01 | −8.2538E−02 | −5.7223E−03 |
| S6 | −4.8682E−01 | 9.4330E−01 | −1.5956E+00 | 1.8777E+00 | −1.4133E+00 | 5.8785E−01 | −9.8000E−02 |
| S7 | −1.4736E−01 | −9.7659E−02 | 1.1029E−01 | −3.4986E−02 | 3.7141E−03 | 1.7896E−04 | −4.3183E−05 |
| S8 | −3.7135E−01 | 1.6530E−01 | −5.4936E−02 | 1.0567E−02 | −3.1236E−04 | −2.3245E−04 | 2.6745E−05 |

Figure 4A:
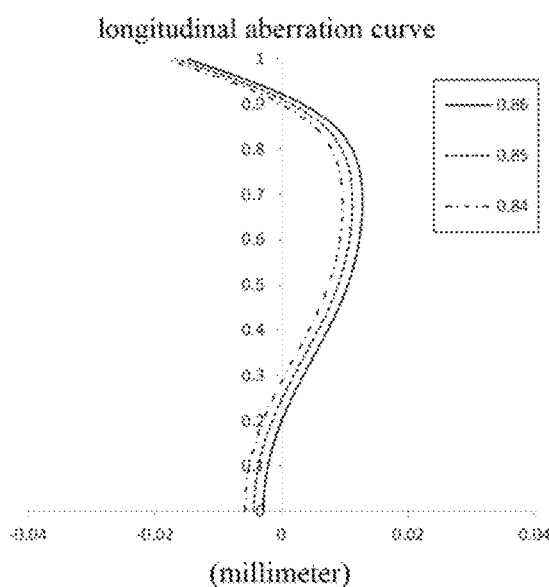
FIG. 4A illustrates a longitudinal aberration curve of the camera lens assembly according to embodiment 2.
Figure 4B:
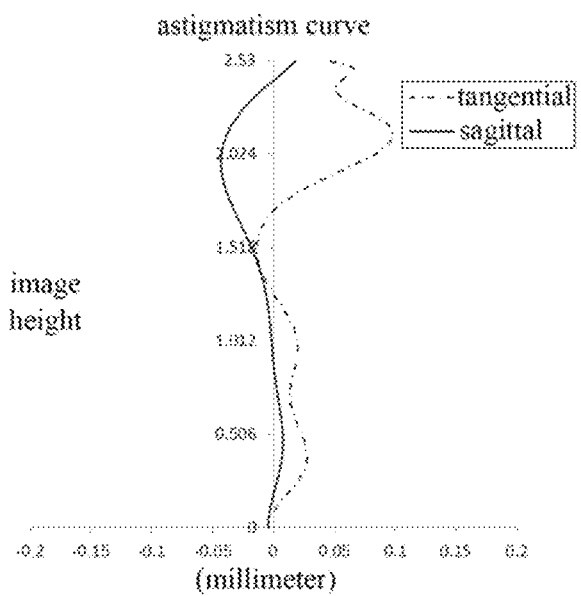
FIG. 4B illustrates an astigmatism curve of the camera lens assembly according to embodiment 2.
Figure 4C:
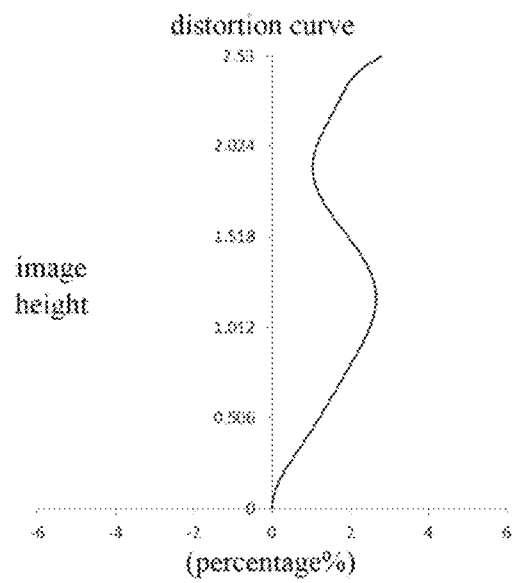
FIG. 4C illustrates a distortion curve of the camera lens assembly according to embodiment 2.
Figure 4D:
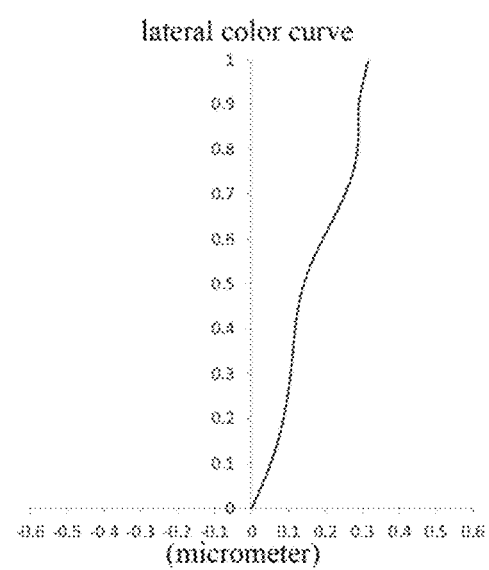
FIG. 4D illustrates a lateral color curve of the camera lens assembly according to embodiment 2.

FIG. 4A shows a longitudinal aberration curve of the camera lens assembly according to embodiment 2, representing deviations of focal points of light in different wavelengths converged after passing through the optical system. FIG. 4B shows an astigmatism curve of the camera lens assembly according to embodiment 2, representing a curvature of a tangential plane and a curvature of a sagittal plane. FIG. 4C shows a distortion curve of the camera lens assembly according to embodiment 2, representing amounts of distortion at different viewing angles. FIG. 4D shows a lateral color curve of the camera lens assembly according to embodiment 2, representing deviations of different image heights on an image plane after light passes through the camera lens assembly. It can be seen from FIG. 4A to FIG. 4D that the camera lens assembly according to embodiment 2 can achieve good image quality.

Embodiment 3

Figure 5:
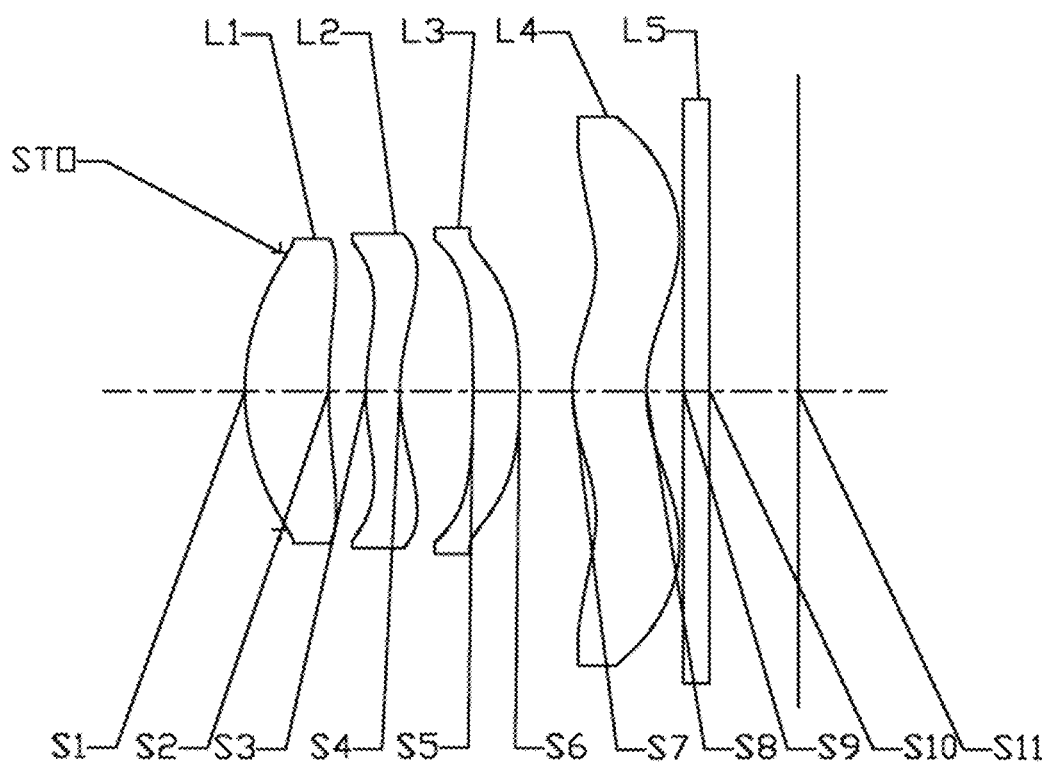
FIG. 5 is a schematic structural view illustrating a camera lens assembly according to embodiment 3 of the present disclosure.

The camera lens assembly according to embodiment 3 of the present disclosure is described below with reference to FIG. 5 to FIG. 6D. FIG. 5 is a schematic structural view illustrating a camera lens assembly according to embodiment 3 of the present disclosure.

As shown in FIG. 5, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust an amount of light entering. Light from an object passes through the surfaces S1 to S10 successively and is finally imaged on the image plane S11.

Table 7 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 3. Table 8 shows the surface type, the radius of curvature, the thickness, the material and the conic coefficient of each lens of the camera lens assembly in embodiment 3, wherein the unit for the radius of curvature and the thickness is millimeter (mm). Table 9 shows higher-order coefficients $A_4, A_6, A_8, A_{10}, A_{12}, A_{14}, A_{16}$ applicable to each aspheric mirror surface S1 to S8 in embodiment 3. Here, the respective aspheric surface type may be defined by the formula 1) given in the above embodiment 1.

TABLE 7

| Parameter | | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| 2.530 | 36.375 | 3.321 | 5.228 | −28.044 | 20.550 | 7.962 | 4.385 |

TABLE 8

| Surface number | Surface type | Radius of curvature | Thickness | Material Refraction index | Abbe number | Conic coefficient |
|---|---|---|---|---|---|---|
| OBJ | spherical | infinite | 400.0000 | | | |
| STO | spherical | infinite | −0.2800 | | | |
| S1 | aspheric | 1.8753 | 0.6635 | 1.640 | 23.53 | −0.4784 |
| S2 | aspheric | 3.8446 | 0.2958 | | | −40.3459 |
| S3 | aspheric | 1.8780 | 0.2700 | 1.544 | 56.11 | −3.3363 |
| S4 | aspheric | 1.5857 | 0.5778 | | | 0.4136 |
| S5 | aspheric | −13.3487 | 0.3707 | 1.640 | 23.53 | 0.0000 |
| S6 | aspheric | −6.5898 | 0.4157 | | | 23.4235 |
| S7 | aspheric | 1.0783 | 0.5882 | 1.544 | 56.11 | −4.6923 |
| S8 | aspheric | 1.1680 | 0.2933 | | | −1.1406 |
| S9 | spherical | infinite | 0.2100 | 1.517 | 64.17 | |
| S10 | spherical | infinite | 0.7000 | | | |
| S11 | spherical | infinite | | | | |

TABLE 9

| Surface number | A4 | A6 | A8 | A10 | A12 | A14 | A16 |
|---|---|---|---|---|---|---|---|
| S1 | −3.2653E−03 | 1.3144E−02 | −1.6915E−02 | 1.7251E−02 | −1.6880E−02 | 1.0863E−02 | −3.9552E−03 |
| S2 | −2.4585E−03 | −3.3799E−02 | 1.0258E−02 | 8.3288E−03 | −1.0829E−02 | −4.0463E−03 | 3.1483E−03 |
| S3 | −2.3626E−01 | 3.1491E−02 | −1.3548E−01 | 2.0013E−01 | −6.2756E−02 | −4.6933E−02 | 2.5452E−02 |
| S4 | −2.4115E−01 | 2.0287E−02 | −1.2114E−01 | 2.4021E−01 | −1.9858E−01 | 6.1970E−02 | −6.2136E−03 |
| S5 | −7.3239E−02 | −7.1026E−02 | 2.8938E−01 | −5.1127E−01 | 3.5186E−01 | −8.1840E−02 | −2.1971E−03 |
| S6 | −3.8560E−01 | 6.4922E−01 | −1.0684E+00 | 1.3214E+00 | −1.0781E+00 | 4.8823E−01 | −8.7469E−02 |
| S7 | −9.0704E−02 | −8.1466E−02 | 7.6317E−02 | −2.3284E−01 | 2.8672E−03 | −4.6779E−05 | −1.1454E−05 |
| S8 | −2.2193E−01 | 4.8402E−02 | 9.4725E−04 | −5.9772E−03 | 2.4117E−03 | −4.3167E−04 | 2.9263E−05 |

Figure 6A:
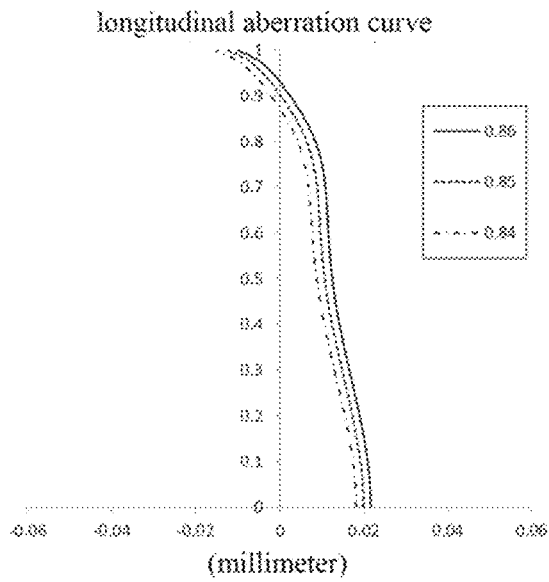
FIG. 6A illustrates a longitudinal aberration curve of the camera lens assembly according to embodiment 3.
Figure 6B:
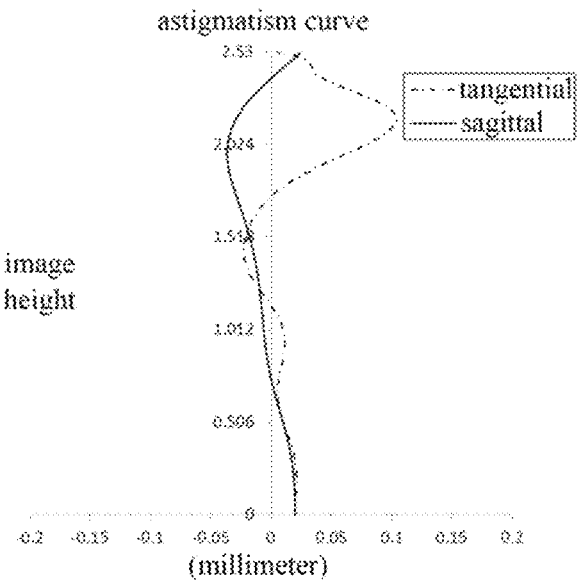
FIG. 6B illustrates an astigmatism curve of the camera lens assembly according to embodiment 3.
Figure 6C:
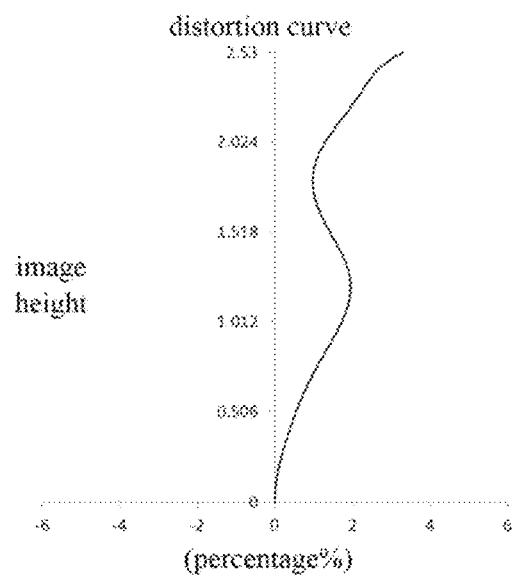
FIG. 6C illustrates a distortion curve of the camera lens assembly according to embodiment 3.
Figure 6D:
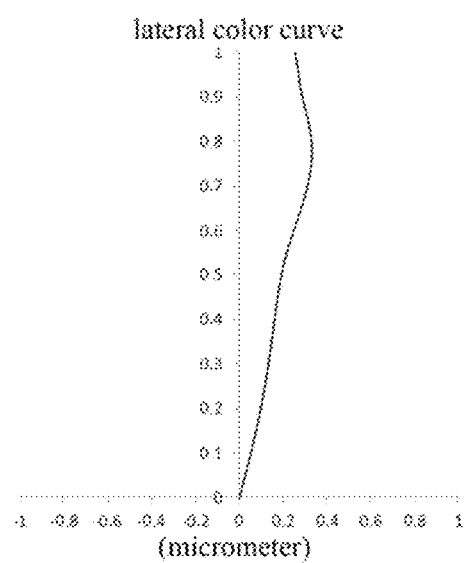
FIG. 6D illustrates a lateral color curve of the camera lens assembly according to embodiment 3.

FIG. 6A shows a longitudinal aberration curve of the camera lens assembly according to embodiment 3, representing deviations of focal points of light in different wavelengths converged after passing through the optical system. FIG. 6B shows an astigmatism curve of the camera lens assembly according to embodiment 3, representing a curvature of a tangential plane and a curvature of a sagittal plane. FIG. 6C shows a distortion curve of the camera lens assembly according to embodiment 3, representing amounts of distortion at different viewing angles. FIG. 6D shows a lateral color curve of the camera lens assembly according to embodiment 3, representing deviations of different image heights on an image plane after light passes through the camera lens assembly. It can be seen from FIG. 6A to FIG. 6D that the camera lens assembly according to embodiment 3 can achieve good image quality.

Embodiment 4

Figure 7:
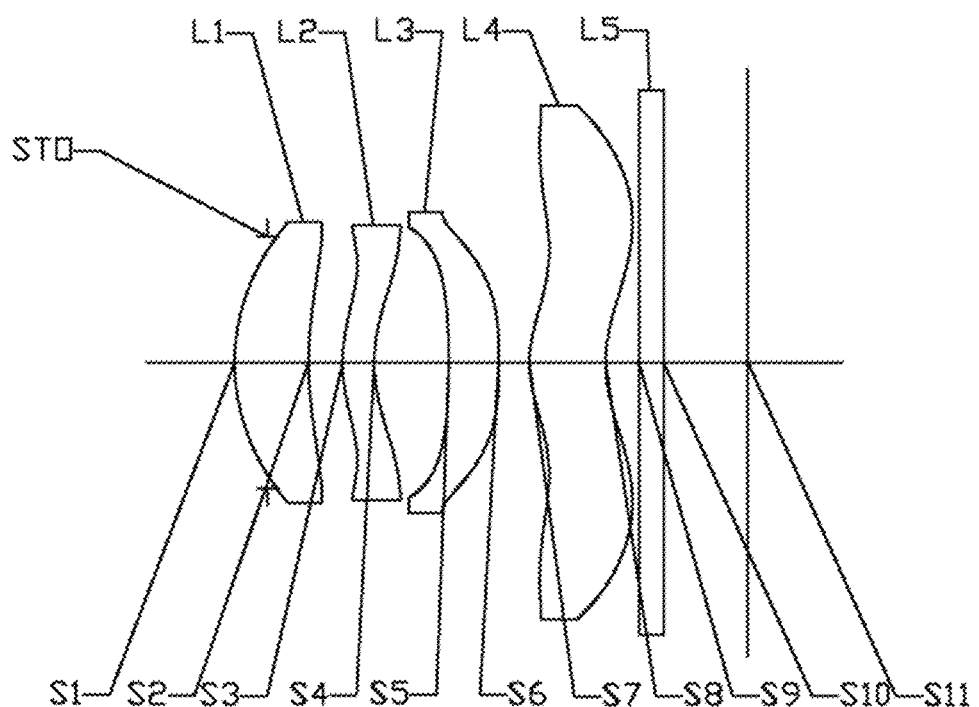
FIG. 7 is a schematic structural view illustrating a camera lens assembly according to embodiment 4 of the present disclosure.

The camera lens assembly according to embodiment 4 of the present disclosure is described below with reference to FIG. 7 to FIG. 8D. FIG. 7 is a schematic structural view illustrating a camera lens assembly according to embodiment 4 of the present disclosure.

As shown in FIG. 7, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust an amount of light entering. Light from an object passes through the surfaces S1 to S10 successively and is finally imaged on the image plane S11.

Table 10 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 4. Table 11 shows the surface type, the radius of curvature, the thickness, the material and the conic coefficient of each lens of the camera lens assembly in embodiment 4, wherein the unit for the radius of curvature and the thickness is millimeter (mm). Table 12 shows higher-order coefficients $A_4, A_6, A_8, A_{10}, A_{12}, A_{14}, A_{16}$ applicable to each aspheric mirror surface S1 to S8 in embodiment 4. Here, the respective aspheric surface type may be defined by the formula 1) given in the above embodiment 1.

TABLE 10

| | Parameter | | | | | | |
|---|---|---|---|---|---|---|---|
| | ImgH (mm) | HFOV (deg) | f (mm) | f1 (mm) | f2 (mm) | f3 (mm) | f4 (mm) | TTL (mm) |
| Value | 2.530 | 36.004 | 3.359 | 5.887 | 90.208 | -15.663 | 4.460 | 4.385 |

TABLE 11

| Surface number | Surface type | Radius of curvature | Thickness | Material Refraction index | Abbe number | Conic coefficient |
|---|---|---|---|---|---|---|
| OBJ | spherical | infinite | 400.0000 | | | |
| STO | spherical | infinite | -0.2800 | | | |
| S1 | aspheric | 1.7646 | 0.6314 | 1.640 | 23.53 | -0.3502 |
| S2 | aspheric | 2.9471 | 0.2908 | | | -26.5841 |
| S3 | aspheric | 1.4116 | 0.2700 | 1.535 | 55.78 | -1.3194 |
| S4 | aspheric | 1.3586 | 0.6376 | | | 0.1647 |
| S5 | aspheric | -7.0620 | 0.4242 | 1.535 | 55.78 | 0.0000 |
| S6 | aspheric | -49.5747 | 0.2636 | | | 898.8538 |
| S7 | aspheric | 0.9471 | 0.6507 | 1.535 | 55.78 | -4.9853 |
| S8 | aspheric | 1.2088 | 0.2859 | | | -0.9712 |
| S9 | spherical | infinite | 0.2100 | 1.517 | 64.17 | |
| S10 | spherical | infinite | 0.7207 | | | |
| S11 | spherical | infinite | | | | |

TABLE 12

| Surface number | A4 | A6 | A8 | A10 | A12 | A14 | A16 |
|---|---|---|---|---|---|---|---|
| S1 | -5.6960E-03 | 1.2812E-02 | -1.0803E-02 | 1.5534E-02 | -1.8526E-02 | 1.1792E-02 | -3.2889E-03 |
| S2 | 1.5864E-02 | -3.6061E-02 | 7.0080E-02 | 1.3880E-02 | -6.5610E-03 | -4.9630E-03 | 2.3538E-03 |
| S3 | -2.2340E-01 | 1.3779E-02 | -1.6803E-01 | 2.0740E-01 | -3.8083E-02 | -3.6802E-02 | 1.4822E-02 |
| S4 | -1.9026E-01 | -6.1164E-02 | -1.0944E-01 | 2.5112E-01 | -1.9321E-01 | 6.3551E-02 | -9.6791E-03 |
| S5 | -7.3411E-02 | -4.8576E-02 | 2.5490E-01 | -4.9486E-01 | 3.5897E-01 | -8.8910E-02 | -5.7420E-03 |
| S6 | -7.9348E-01 | 1.5321E+00 | -2.3684E+00 | 2.5268E+00 | -1.7280E+00 | 6.6433E-01 | -1.0523E-01 |
| S7 | -2.1702E-01 | 7.6272E-02 | -7.4839E-03 | 3.3409E-04 | -5.8280E-04 | 1.6302E-04 | -1.2493E-05 |
| S8 | -2.7819E-01 | 9.6358E-02 | -2.0087E-02 | -6.9409E-04 | 1.4977E-03 | -3.1369E-04 | 2.1384E-05 |

Figure 8A:
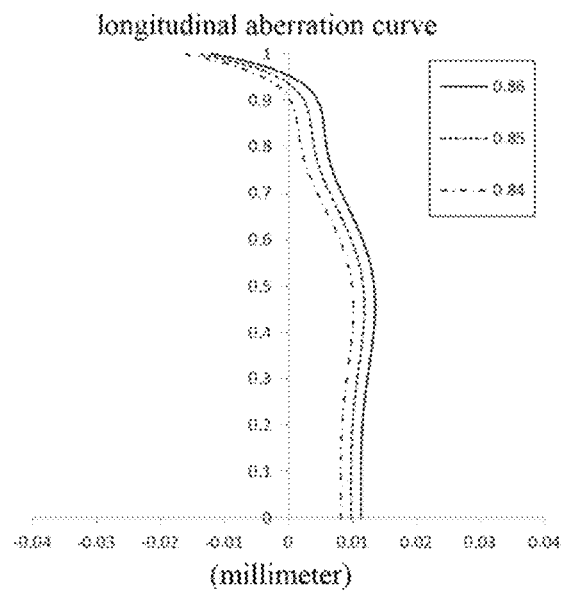
FIG. 8A illustrates a longitudinal aberration curve of the camera lens assembly according to embodiment 4.
Figure 8B:
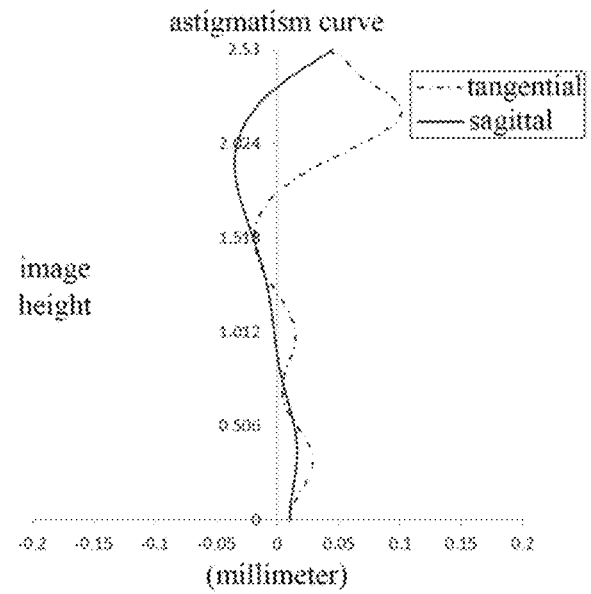
FIG. 8B illustrates an astigmatism curve of the camera lens assembly according to embodiment 4.
Figure 8C:
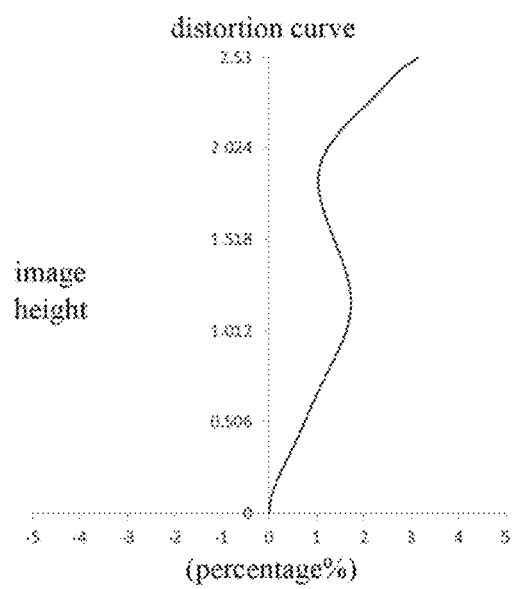
FIG. 8C illustrates a distortion curve of the camera lens assembly according to embodiment 4.
Figure 8D:
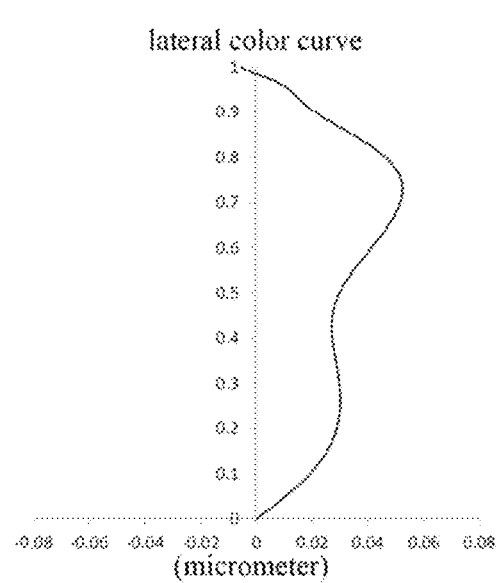
FIG. 8D illustrates a lateral color curve of the camera lens assembly according to embodiment 4.

FIG. 8A shows a longitudinal aberration curve of the camera lens assembly according to embodiment 4, representing deviations of focal points of light in different wavelengths converged after passing through the optical system. FIG. 8B shows an astigmatism curve of the camera lens assembly according to embodiment 4, representing a curvature of a tangential plane and a curvature of a sagittal plane. FIG. 8C shows a distortion curve of the camera lens assembly according to embodiment 4, representing amounts of distortion at different viewing angles. FIG. 8D shows a lateral color curve of the camera lens assembly according to embodiment 4, representing deviations of different image heights on an image plane after light passes through the camera lens assembly. It can be seen from FIG. 8A to FIG. 8D that the camera lens assembly according to embodiment 4 can achieve good image quality.

Embodiment 5

Figure 9:
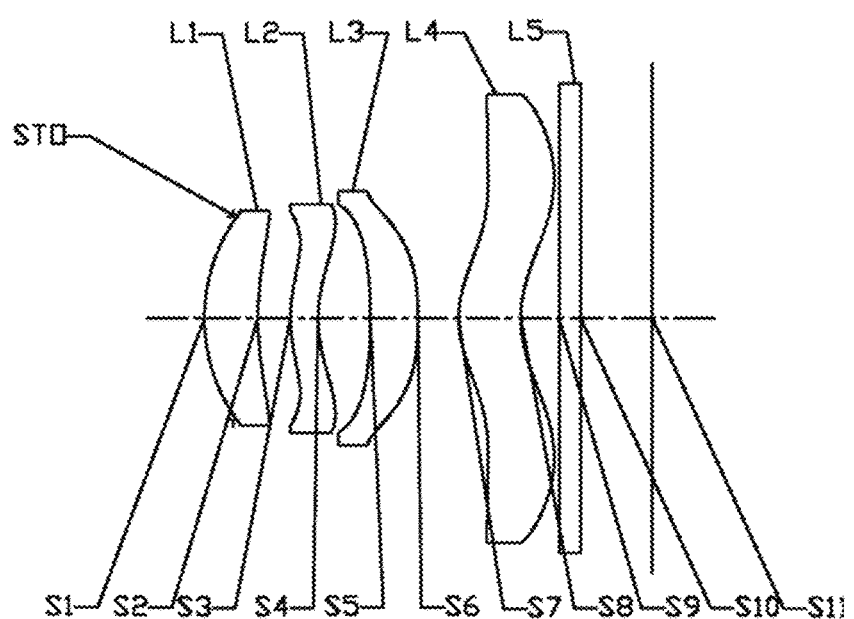
FIG. 9 is a schematic structural view illustrating a camera lens assembly according to embodiment 5 of the present disclosure.

The camera lens assembly according to embodiment 5 of the present disclosure is described below with reference to FIG. 9 to FIG. 10D. FIG. 9 is a schematic structural view illustrating a camera lens assembly according to embodiment 5 of the present disclosure.

As shown in FIG. 9, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust an amount of light entering. Light from an object passes through the surfaces S1 to S10 successively and is finally imaged on the image plane S11.

Table 13 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 5. Table 14 shows the surface type, the radius of curvature, the thickness, the material and the conic coefficient of each lens of the camera lens assembly in embodiment 5, wherein the unit for the radius of curvature and the thickness is millimeter (mm). Table 15 shows higher-order coefficients $A_4, A_6, A_8, A_{10}, A_{12}, A_{14}, A_{16}$ applicable to each aspheric mirror surface S1 to S8 in embodiment 5. Here, the respective aspheric surface type may be defined by the formula 1) given in the above embodiment 1.

TABLE 13

| | Parameter | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| Value 2.530 | 37.325 | 3.200 | 5.982 | −86.779 | 120.874 | 4.992 | 4.385 |

TABLE 14

| Surface number | Surface type | Radius of curvature | Thickness | Material Refraction index | Abbe number | Conic coefficient |
|---|---|---|---|---|---|---|
| OBJ | spherical | infinite | 400.0000 | | | |
| STO | spherical | infinite | −0.2800 | | | |
| S1 | aspheric | 1.7541 | 0.5242 | 1.640 | 23.53 | −0.3255 |
| S2 | aspheric | 2.9460 | 0.3196 | | | −20.3405 |
| S3 | aspheric | 1.5438 | 0.2700 | 1.535 | 55.78 | −1.7447 |
| S4 | aspheric | 1.4032 | 0.5112 | | | 0.2906 |
| S5 | aspheric | −6.1191 | 0.4655 | 1.535 | 55.78 | 0.0000 |
| S6 | aspheric | −5.7301 | 0.3982 | | | 17.1843 |
| S7 | aspheric | 0.9647 | 0.6092 | 1.535 | 55.78 | −4.9119 |
| S8 | aspheric | 1.1903 | 0.3773 | | | −0.9748 |
| S9 | spherical | infinite | 0.2100 | 1.517 | 64.17 | |
| S10 | spherical | infinite | 0.7000 | | | |
| S11 | spherical | infinite | | | | |

TABLE 15

| Surface number | A4 | A6 | A8 | A10 | A12 | A14 | A16 |
|---|---|---|---|---|---|---|---|
| S1 | −3.5618E−03 | 1.6908E−02 | −1.1653E−02 | 1.7469E−02 | −1.9972E−02 | 1.1893E−02 | −3.6302E−03 |
| S2 | 1.0308E−02 | −2.4374E−02 | 1.2166E−02 | 2.4642E−03 | −1.5276E−02 | 6.1378E−04 | 2.7792E−03 |
| S3 | −2.3256E−01 | 5.8166E−03 | −1.6964E−01 | 1.9142E−01 | −5.2582E−02 | −4.0906E−02 | 3.0617E−02 |
| S4 | −2.1686E−01 | −4.4724E−02 | −1.1608E−01 | 2.4365E−01 | −1.9747E−01 | 6.1651E−02 | −1.0839E−02 |
| S5 | −8.3022E−02 | −5.1811E−02 | 2.6223E−01 | −4.8177E−01 | 3.6625E−01 | −9.1530E−02 | −1.4395E−02 |
| S6 | −5.1664E−01 | 9.0724E−01 | −1.5018E+00 | 1.7911E+00 | −1.3521E+00 | 5.6348E−01 | −9.4448E−02 |
| S7 | 3.5035E−02 | −2.0318E−01 | 1.6611E−01 | −6.7764E−02 | 1.5556E−02 | −1.9069E−03 | 9.6461E−05 |
| S8 | −1.5648E−01 | −1.8274E−02 | 3.4421E−02 | −1.3764E−02 | 2.6730E−03 | −2.4675E−04 | 7.8197E−06 |

Figure 10A:
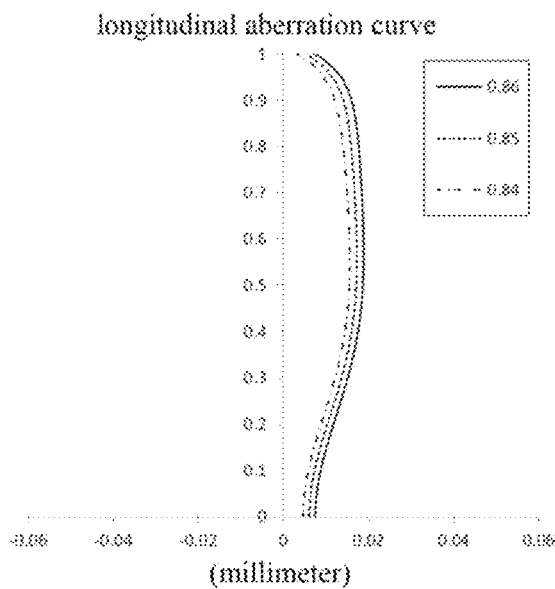
FIG. 10A illustrates a longitudinal aberration curve of the camera lens assembly according to embodiment 5.
Figure 10B:
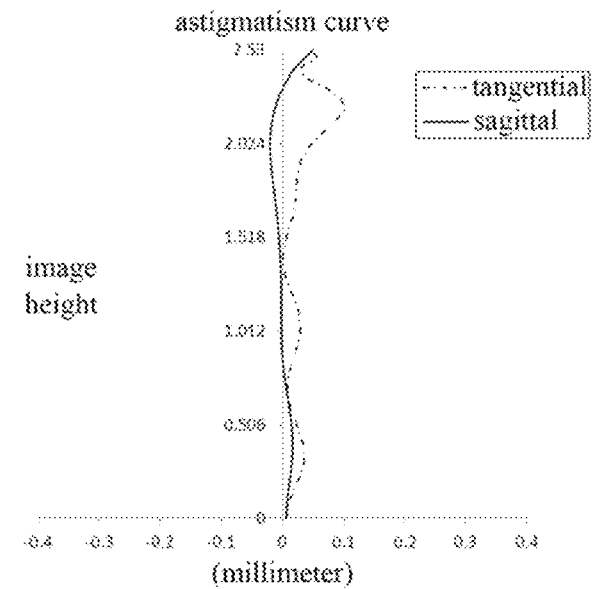
FIG. 10B illustrates an astigmatism curve of the camera lens assembly according to embodiment 5.
Figure 10C:
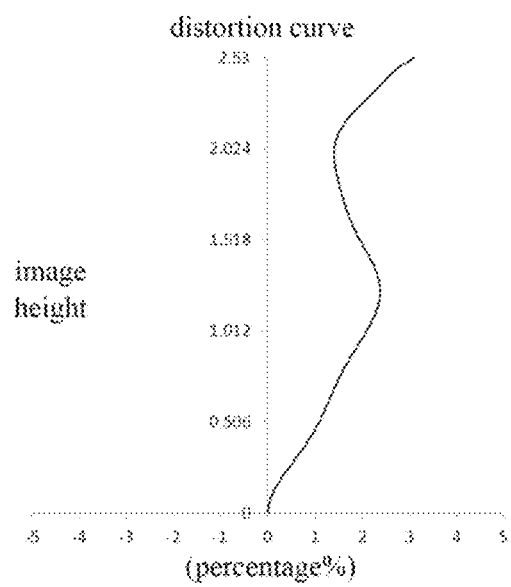
FIG. 10C illustrates a distortion curve of the camera lens assembly according to embodiment 5.
Figure 10D:
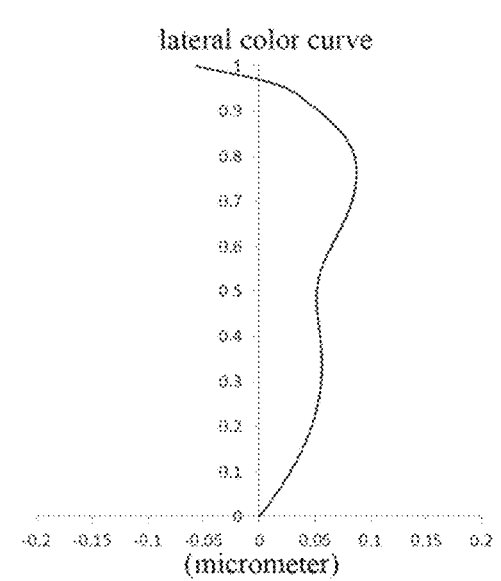
FIG. 10D illustrates a lateral color curve of the camera lens assembly according to embodiment 5.

FIG. 10A shows a longitudinal aberration curve of the camera lens assembly according to embodiment 5, representing deviations of focal points of light in different wavelengths converged after passing through the optical system. FIG. 10B shows an astigmatism curve of the camera lens assembly according to embodiment 5, representing a curvature of a tangential plane and a curvature of a sagittal plane. FIG. 10C shows a distortion curve of the camera lens assembly according to embodiment 5, representing amounts of distortion at different viewing angles. FIG. 10D shows a lateral color curve of the camera lens assembly according to embodiment 5, representing deviations of different image heights on an image plane after light passes through the camera lens assembly. It can be seen from FIG. 10A to FIG. 10D that the camera lens assembly according to embodiment 5 can achieve good image quality.

Embodiment 6

Figure 11:
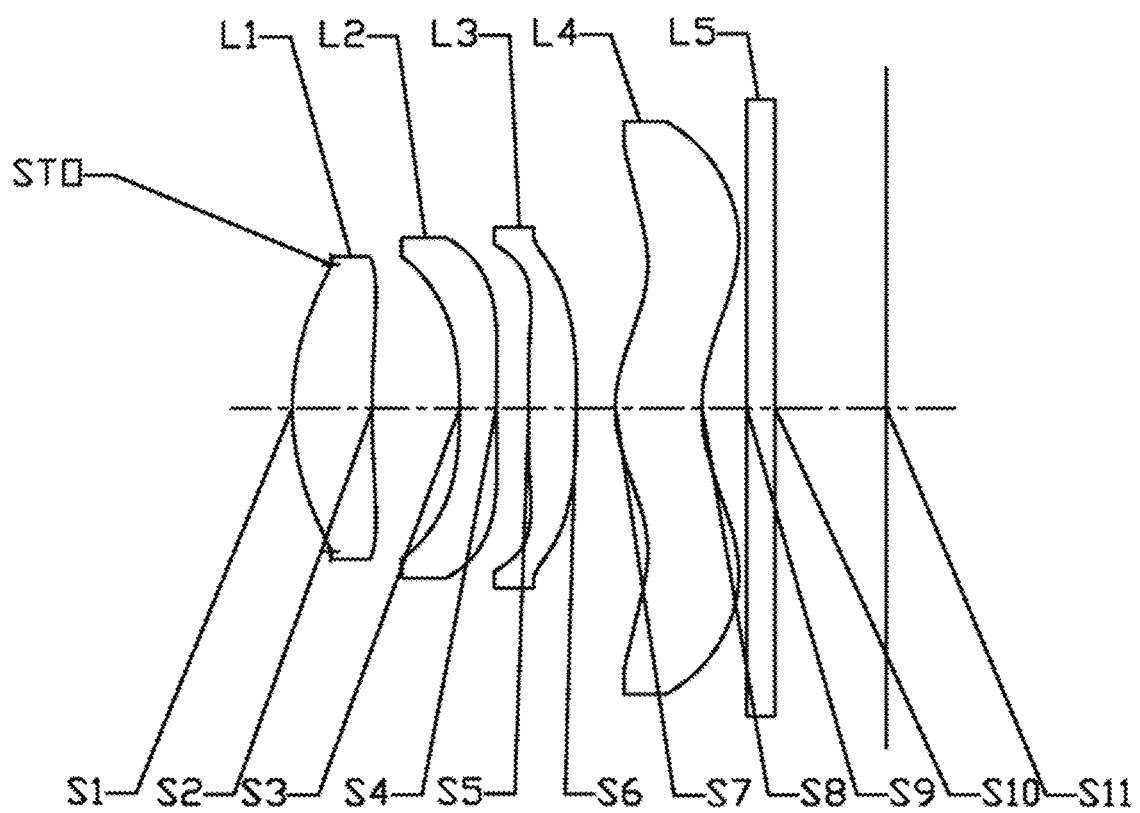
FIG. 11 is a schematic structural view illustrating a camera lens assembly according to embodiment 6 of the present disclosure.

The camera lens assembly according to embodiment 6 of the present disclosure is described below with reference to FIG. 11 to FIG. 12D. FIG. 11 is a schematic structural view illustrating a camera lens assembly according to embodiment 6 of the present disclosure.

As shown in FIG. 11, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust an amount of light entering. Light from an object passes through the surfaces S1 to S10 successively and is finally imaged on the image plane S11.

Table 16 shows half the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 6. Table 17 shows the surface type, the radius of curvature, the thickness, the material and the conic coefficient of each lens of the camera lens assembly in embodiment 6, wherein the unit for the radius of curvature and the thickness is millimeter (mm). Table 18 shows higher-order coefficients $A_4, A_6, A_8, A_{10}, A_{12}, A_{14}, A_{16}$ applicable to each aspheric mirror surface S1 to S8 in embodiment 6. Here, the respective aspheric surface type may be defined by the formula 1) given in the above embodiment 1.

TABLE 16

| Parameter | | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| Value 2.530 | 36.437 | 3.319 | 3.945 | −5.702 | −364.513 | 3.933 | 4.385 |

TABLE 17

| Surface number | Surface type | Radius of curvature | Thickness | Material | | Conic coefficient |
|---|---|---|---|---|---|---|
| | | | | Refraction index | Abbe number | |
| OBJ | spherical | infinite | 400.0000 | | | |
| STO | spherical | infinite | −0.2800 | | | |
| S1 | aspheric | 1.9010 | 0.5890 | 1.640 | 23.53 | −0.1738 |
| S2 | aspheric | 7.4934 | 0.6453 | | | 0.0000 |
| S3 | aspheric | −4.1357 | 0.2700 | 1.535 | 55.78 | −64.1628 |
| S4 | aspheric | 11.2968 | 0.2398 | | | 13.9247 |
| S5 | aspheric | 35.5000 | 0.3512 | 1.535 | 55.78 | 0.0000 |
| S6 | aspheric | 29.8672 | 0.2874 | | | 0.0000 |
| S7 | aspheric | 0.9076 | 0.6390 | 1.535 | 55.78 | −3.6405 |
| S8 | aspheric | 1.2205 | 0.3319 | | | −1.2161 |
| S9 | spherical | infinite | 0.2100 | 1.517 | 64.17 | |
| S10 | spherical | infinite | 0.8214 | | | |
| S11 | spherical | infinite | | | | |

TABLE 18

| Surface number | A4 | A6 | A8 | A10 | A12 | A14 | A16 |
|---|---|---|---|---|---|---|---|
| S1 | −2.0449E−03 | −1.9920E−03 | −5.2135E−03 | −2.5586E−04 | −1.6076E−02 | 2.2366E−02 | −1.2014E−02 |
| S2 | −2.1984E−02 | −8.8947E−03 | −2.1312E−02 | 8.0361E−03 | −2.1681E−03 | −7.8903E−03 | 3.3133E−03 |
| S3 | −3.1248E−01 | 1.5212E−01 | −1.4786E−01 | 1.3913E−01 | −4.8187E−02 | −8.9247E−03 | −3.2743E−05 |
| S4 | −9.8190E−02 | −6.4860E−02 | −9.9009E−02 | 2.5582E−01 | −1.9988E−01 | 5.8077E−02 | −4.6776E−03 |
| S5 | 1.0157E−01 | −2.0823E−01 | 2.7749E−01 | −4.3252E−01 | 3.1030E−01 | −1.2303E−01 | 2.3352E−02 |
| S6 | −5.7846E−01 | 1.2662E+00 | −2.1036E+00 | 2.4480E+00 | −1.8852E+00 | 8.0782E−01 | −1.3940E−01 |
| S7 | −1.3890E−01 | 7.9014E−02 | −1.4082E−01 | 1.1431E−01 | −4.2361E−02 | 7.4467E−03 | −5.0692E−04 |
| S8 | −1.3921E−01 | −4.6386E−02 | 6.4198E−02 | −3.3380E−02 | 9.7340E−03 | −1.5063E−03 | 9.4312E−05 |

Figure 12A:
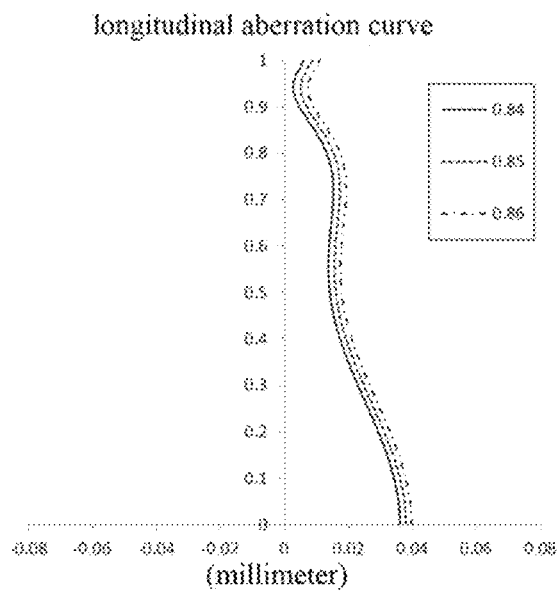
FIG. 12A illustrates a longitudinal aberration curve of the camera lens assembly according to embodiment 6.
Figure 12B:
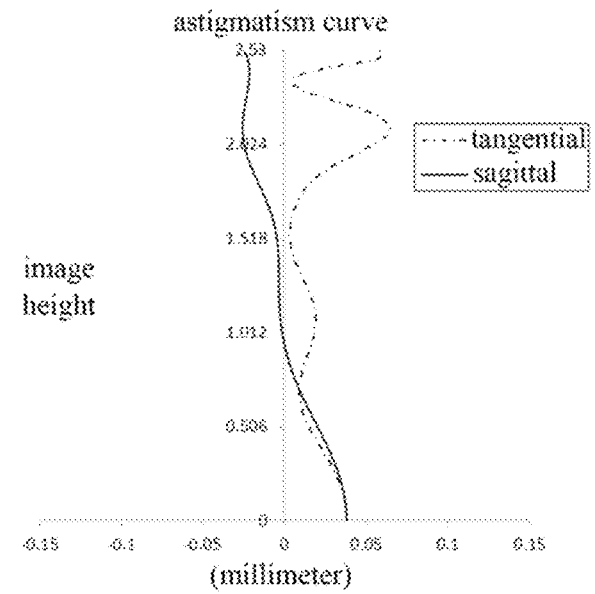
FIG. 12B illustrates an astigmatism curve of the camera lens assembly according to embodiment 6.
Figure 12C:
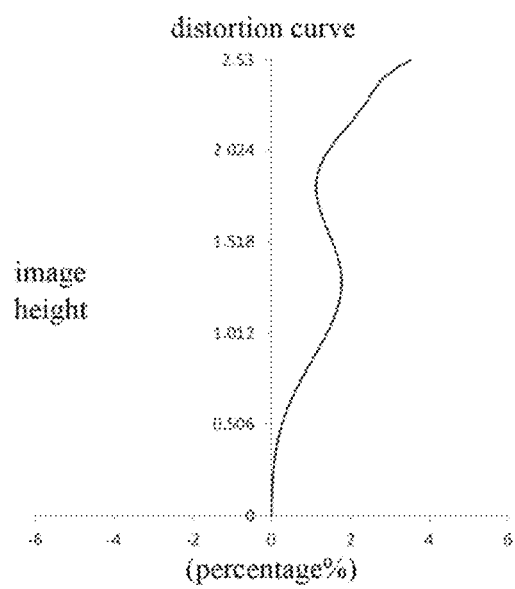
FIG. 12C illustrates a distortion curve of the camera lens assembly according to embodiment 6.
Figure 12D:
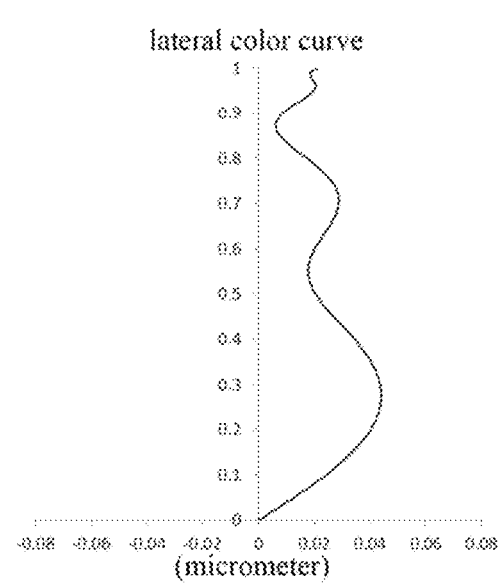
FIG. 12D illustrates a lateral color curve of the camera lens assembly according to embodiment 6.

FIG. 12A shows a longitudinal aberration curve of the camera lens assembly according to embodiment 6, representing deviations of focal points of light in different wavelengths converged after passing through the optical system. FIG. 12B shows an astigmatism curve of the camera lens assembly according to embodiment 6, representing a curvature of a tangential plane and a curvature of a sagittal plane. FIG. 12C shows a distortion curve of the camera lens assembly according to embodiment 6, representing amounts of distortion at different viewing angles. FIG. 12D shows a lateral color curve of the camera lens assembly according to embodiment 6, representing deviations of different image heights on an image plane after light passes through the camera lens assembly. It can be seen from FIG. 12A to FIG. 12D that the camera lens assembly according to embodiment 6 can achieve good image quality.

Embodiment 7

Figure 13:
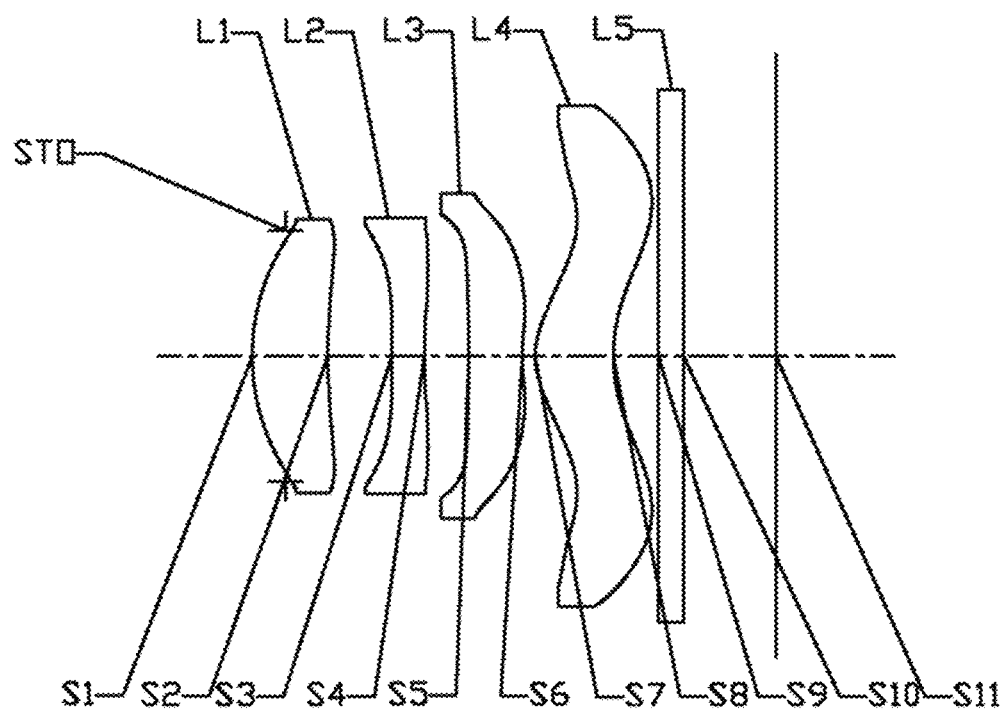
FIG. 13 is a schematic structural view illustrating a camera lens assembly according to embodiment 7 of the present disclosure.

The camera lens assembly according to embodiment 7 of the present disclosure is described below with reference to FIG. 13 to FIG. 14D. FIG. 13 is a schematic structural view illustrating a camera lens assembly according to embodiment 7 of the present disclosure.

As shown in FIG. 13, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust an amount of light entering. Light from an object passes through the surfaces S1 to S10 successively and is finally imaged on the image plane S11.

Table 19 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 7. Table 20 shows the surface type, the radius of curvature, the thickness, the material and the conic coefficient of each lens of the camera lens assembly in embodiment 7, wherein the unit for the radius of curvature and the thickness is millimeter (mm). Table 21 shows higher-order coefficients $A_4, A_6, A_8, A_{10}, A_{12}, A_{14}, A_{16}$ applicable to each aspheric mirror surface S1 to S8 in embodiment 7. Here, the respective aspheric surface type may be defined by the formula 1) given in the above embodiment 1.

TABLE 19

| Parameter | | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| Value 2.530 | 36.437 | 3.319 | 3.945 | −7.877 | −2.399 | 1.518 | 4.385 |

TABLE 20

| Surface number | Surface type | Radius of curvature | Thickness | Material Refraction index | Material Abbe number | Conic coefficient |
|---|---|---|---|---|---|---|
| OBJ | spherical | infinite | 400.0000 | | | |
| STO | spherical | infinite | −0.2800 | | | |
| S1 | aspheric | 1.7870 | 0.6345 | 1.640 | 23.53 | −0.1631 |
| S2 | aspheric | 5.6905 | 0.5361 | | | −58.3016 |
| S3 | aspheric | −194.6483 | 0.2700 | 1.535 | 55.78 | −64.1628 |
| S4 | aspheric | 4.2484 | 0.3714 | | | 11.5538 |
| S5 | aspheric | −10.6738 | 0.4502 | 1.535 | 55.78 | 73.0292 |
| S6 | aspheric | 1.4569 | 0.1068 | | | −59.0535 |
| S7 | aspheric | 0.5940 | 0.6548 | 1.535 | 55.78 | −4.7083 |
| S8 | aspheric | 1.4227 | 0.3773 | | | −1.3747 |
| S9 | spherical | infinite | 0.2100 | 1.517 | 64.17 | |
| S10 | spherical | infinite | 0.7739 | | | |
| S11 | spherical | infinite | | | | |

TABLE 21

| Surface number | A4 | A6 | A8 | A10 | A12 | A14 | A16 |
|---|---|---|---|---|---|---|---|
| S1 | −2.4319E−03 | 1.5900E−02 | −2.1242E−02 | 9.1457E−03 | −1.0635E−02 | 1.6194E−02 | −9.5431E−03 |
| S2 | 2.3150E−02 | −3.4563E−02 | −1.0989E−03 | 9.1390E−03 | −1.1704E−02 | −4.1603E−03 | 2.9767E−03 |
| S3 | −1.9975E−01 | 7.5227E−02 | −1.5094E−01 | 1.6966E−01 | −4.2778E−02 | −4.3362E−02 | 2.6394E−02 |
| S4 | −1.3048E−01 | 2.7204E−02 | −1.3748E−01 | 2.3548E−01 | −1.8758E−01 | 7.1145E−02 | −1.0094E−02 |
| S5 | 1.1210E−01 | −2.0144E−01 | 3.2267E−01 | −4.7081E−01 | 3.2485E−01 | −1.0138E−01 | 8.1921E−03 |
| S6 | −8.1659E−01 | 1.7679E+00 | −2.6873E+00 | 2.6265E+00 | −1.5852E+00 | 5.2488E−01 | −7.1228E−02 |
| S7 | 3.5087E−02 | −7.5686E−02 | −4.8803E−02 | 6.2549E−02 | −2.2373E−02 | 3.4801E−03 | −2.0397E−04 |
| S8 | 7.1284E−02 | −2.5690E−01 | 1.8340E−01 | −7.3402E−02 | 1.7079E−02 | −2.1150E−03 | 1.0625E−04 |

Figure 14A:
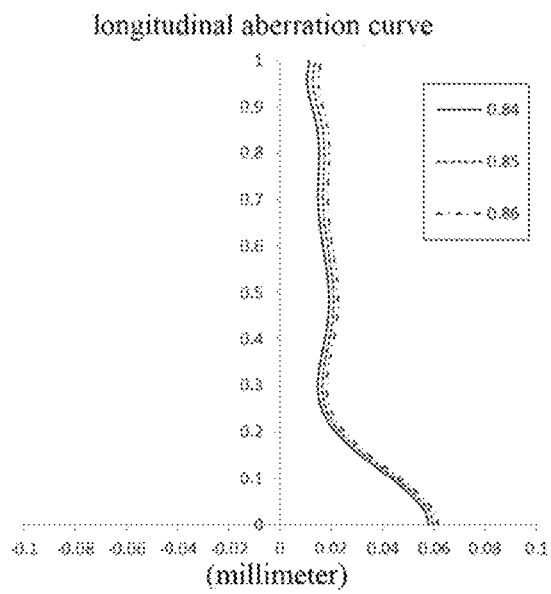
FIG. 14A illustrates a longitudinal aberration curve of the camera lens assembly according to embodiment 7.
Figure 14B:
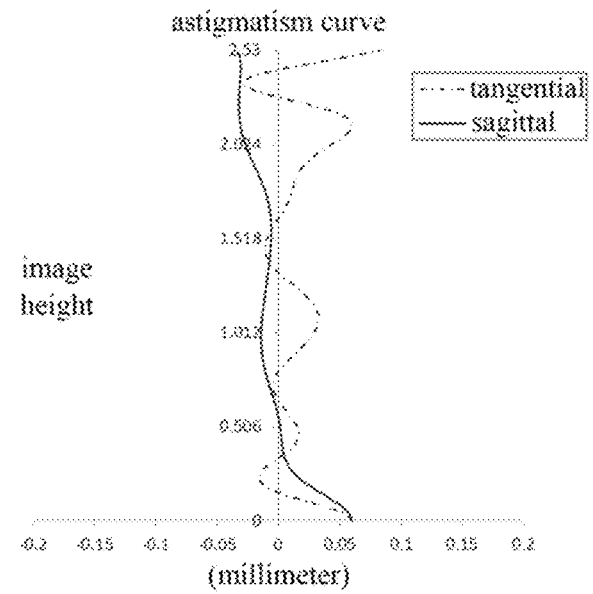
FIG. 14B illustrates an astigmatism curve of the camera lens assembly according to embodiment 7.
Figure 14C:
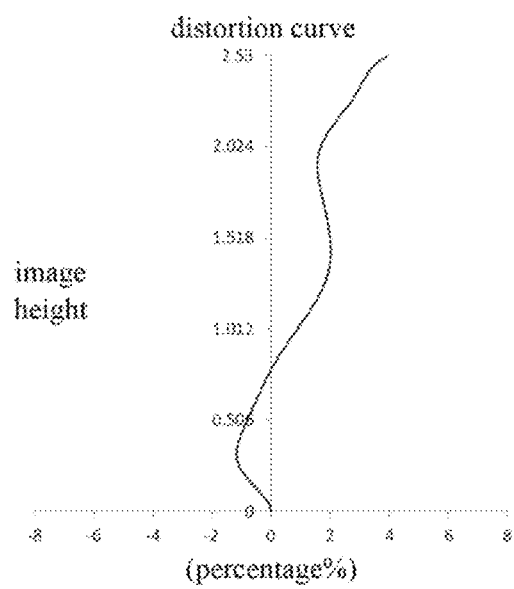
FIG. 14C illustrates a distortion curve of the camera lens assembly according to embodiment 7.
Figure 14D:
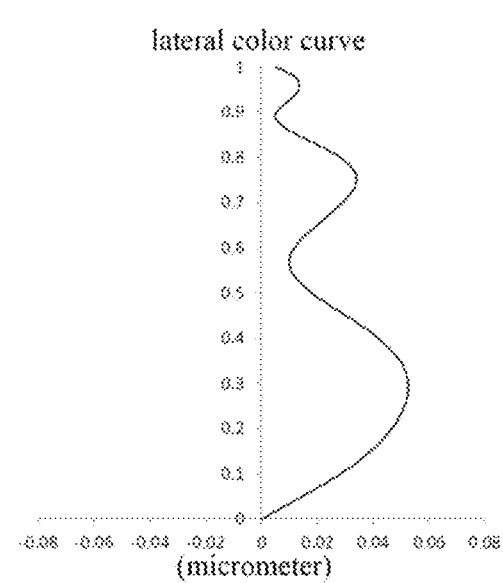
FIG. 14D illustrates a lateral color curve of the camera lens assembly according to Embodiment 7.

FIG. 14A shows a longitudinal aberration curve of the camera lens assembly according to embodiment 7, representing deviations of focal points of light in different wavelengths converged after passing through the optical system. FIG. 14B shows an astigmatism curve of the camera lens assembly according to embodiment 7, representing a curvature of a tangential plane and a curvature of a sagittal plane. FIG. 14C shows a distortion curve of the camera lens assembly according to embodiment 7, representing amounts of distortion at different viewing angles. FIG. 14D shows a lateral color curve of the camera lens assembly according to embodiment 7, representing deviations of different image heights on an image plane after light passes through the camera lens assembly. It can be seen from FIG. 14A to FIG. 14D that the camera lens assembly according to embodiment 7 can achieve good image quality.

Embodiment 8

Figure 15:
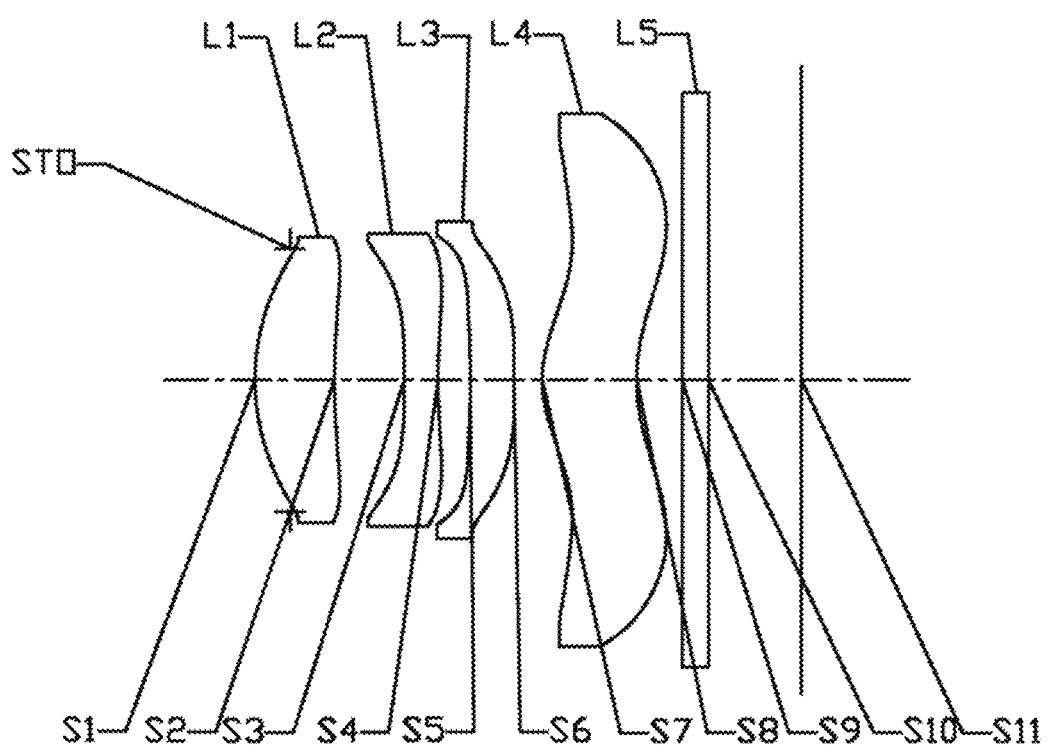
FIG. 15 is a schematic structural view illustrating a camera lens assembly according to embodiment 8 of the present disclosure.

The camera lens assembly according to embodiment 8 of the present disclosure is described below with reference to FIG. 15 to FIG. 16D. FIG. 15 is a schematic structural view illustrating a camera lens assembly according to embodiment 8 of the present disclosure.

As shown in FIG. 15, the camera lens assembly includes four lenses L1 to L4 arranged in sequence from an object side to an image side along an optical axis. The first lens L1 has an object-side surface S1 and an image side-surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, an diaphragm STO may also be provided to adjust an amount of light entering. Light from an object passes through the surfaces S1 to S10 successively and is finally imaged on the image plane S11.

Table 22 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 8. Table 23 shows the surface type, the radius of curvature, the thickness, the material and the conic coefficient of each lens of the camera lens assembly in embodiment 8, wherein the unit for the radius of curvature and the thickness is millimeter (mm). Table 24 shows higher-order coefficients $A_4, A_6, A_8, A_{10}, A_{12}, A_{14}, A_{16}$ applicable to each aspheric mirror surface S1 to S8 in embodiment 8. Here, the respective aspheric surface type may be defined by the formula 1) given in the above embodiment 1.

TABLE 22

| Parameter | | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| Value 2.530 | 36.385 | 3.319 | 3.855 | −6.452 | −8.746 | 2.896 | 4.385 |

TABLE 23

| Surface number | Surface type | Radius of curvature | Thickness | Material Refraction index | Abbe number | Conic coefficient |
|---|---|---|---|---|---|---|
| OBJ | spherical | infinite | 400.0000 | | | |
| STO | spherical | infinite | −0.2800 | | | |
| S1 | aspheric | 1.7840 | 0.6387 | 1.640 | 23.53 | −0.2656 |
| S2 | aspheric | 6.0639 | 0.5597 | | | −62.7736 |
| S3 | aspheric | −13.1880 | 0.2700 | 1.535 | 55.78 | −90.0000 |
| S4 | aspheric | 4.6211 | 0.2575 | | | 5.6992 |
| S5 | aspheric | −8.8339 | 0.3518 | 1.535 | 55.78 | 0.0000 |
| S6 | aspheric | 9.7930 | 0.2267 | | | −64.9346 |
| S7 | aspheric | 0.8910 | 0.7583 | 1.535 | 55.78 | −4.4897 |
| S8 | aspheric | 1.5091 | 0.3663 | | | −1.2423 |
| S9 | spherical | infinite | 0.2100 | 1.517 | 64.17 | |
| S10 | spherical | infinite | 0.7460 | | | |
| S11 | spherical | infinite | | | | |

TABLE 24

| Surface number | A4 | A6 | A8 | A10 | A12 | A14 | A16 |
|---|---|---|---|---|---|---|---|
| S1 | 1.2894E−03 | 1.1875E−02 | −2.4765E−02 | 1.3670E−02 | −1.1443E−02 | 1.4572E−02 | −9.9184E−03 |
| S2 | 1.6051E−02 | −3.8993E−02 | −2.9149E−03 | 8.5369E−03 | −1.1821E−02 | −3.7954E−03 | 2.9444E−03 |
| S3 | −2.2828E−02 | 6.6615E−02 | −1.5244E−01 | 1.8856E−01 | −4.0967E−02 | −4.4066E−02 | 2.2229E−02 |
| S4 | −9.8358E−02 | −1.5773E−03 | −1.3084E−01 | 2.3991E−01 | −1.9091E−01 | 7.0130E−02 | −1.0906E−02 |
| S5 | 6.2827E−02 | −1.3271E−01 | 2.5742E−01 | −4.9619E−01 | 3.5196E−01 | −8.5585E−02 | −4.8499E−03 |
| S6 | −8.0452E−01 | 1.6872E+00 | −2.8055E+00 | 3.2761E+00 | −2.4884E+00 | 1.0629E+00 | −1.8624E−01 |
| S7 | −1.0741E−01 | 2.3903E−02 | −5.2727E−02 | 5.1628E−02 | −2.0284E−02 | 3.6092E−03 | −2.4328E−04 |
| S8 | −6.9466E−02 | −9.9390E−02 | 9.5279E−02 | −4.4854E−02 | 1.2038E−02 | −1.7200E−03 | 1.0017E−04 |

Figure 16A:
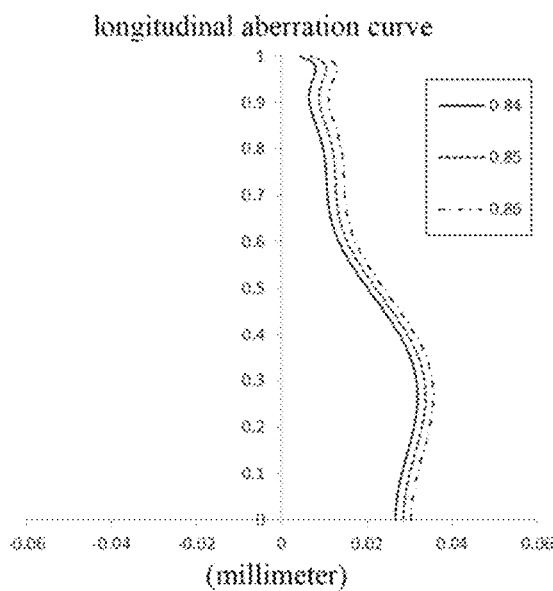
FIG. 16A illustrates a longitudinal aberration curve of the camera lens assembly according to embodiment 8.
Figure 16B:
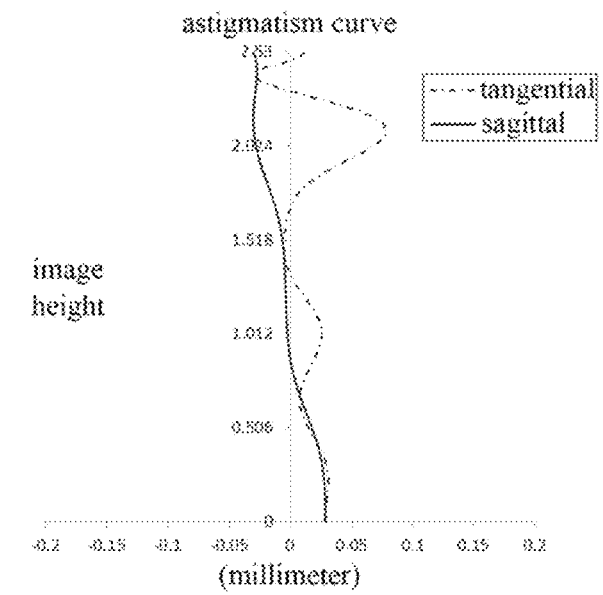
FIG. 16B illustrates an astigmatism curve of the camera lens assembly according to embodiment 8.
Figure 16C:
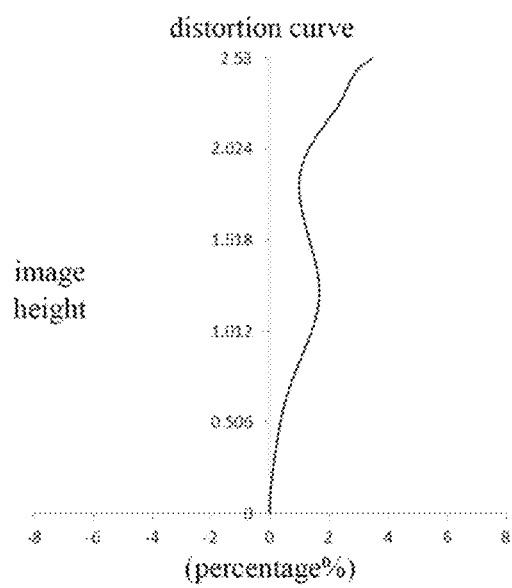
FIG. 16C illustrates a distortion curve of the camera lens assembly according to embodiment 8.
Figure 16D:
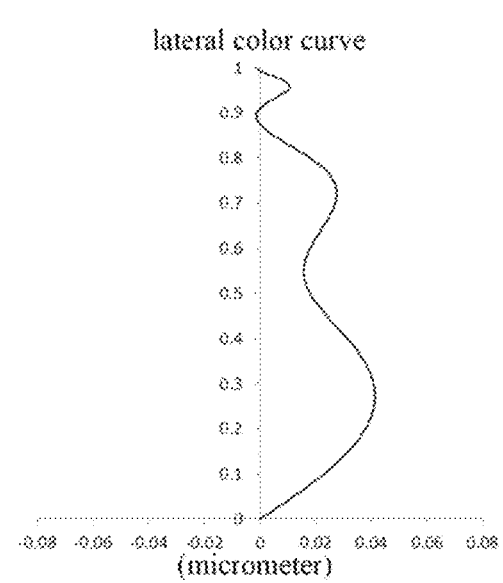
FIG. 16D illustrates a lateral color curve of the camera lens assembly according to embodiment 8.

FIG. 16A shows a longitudinal aberration curve of the camera lens assembly according to embodiment 8, representing deviations of focal points of light in different wavelengths converged after passing through the optical system. FIG. 16B shows an astigmatism curve of the camera lens assembly according to embodiment 8, representing a curvature of a tangential plane and a curvature of a sagittal plane. FIG. 16C shows a distortion curve of the camera lens assembly according to embodiment 8, representing amounts of distortion at different viewing angles. FIG. 16D shows a lateral color curve of the camera lens assembly according to embodiment 8, representing deviations of different image heights on an image plane after light passes through the camera lens assembly. It can be seen from FIG. 16A to FIG. 16D that the camera lens assembly according to embodiment 8 can achieve good image quality.

Embodiment 9

Figure 17:
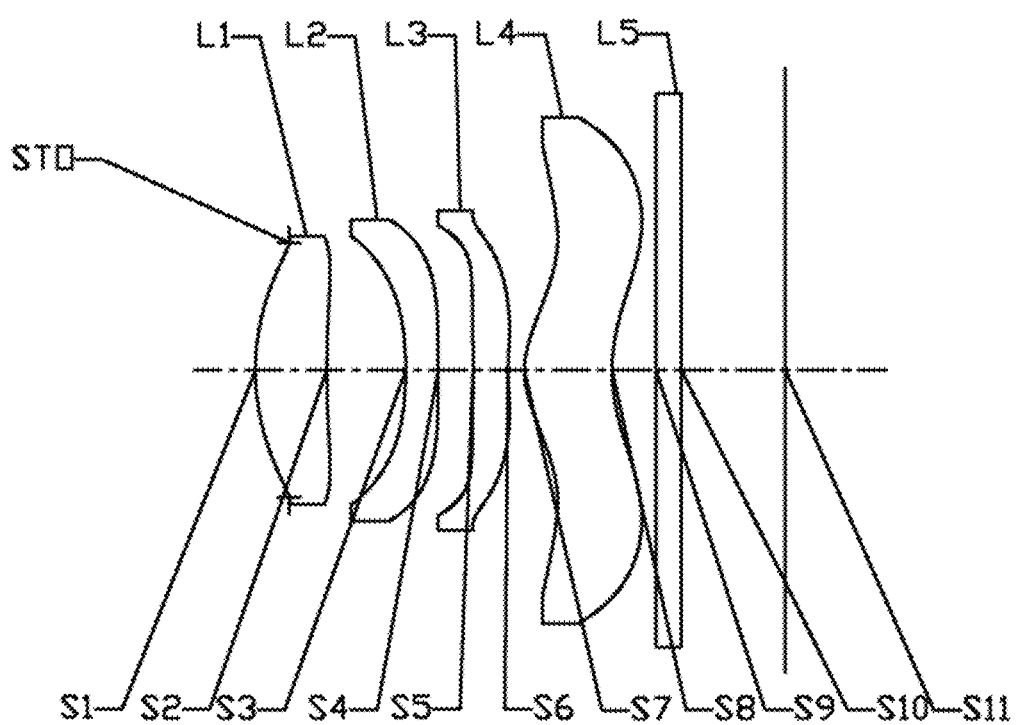
FIG. 17 is a schematic structural view illustrating a camera lens assembly according to embodiment 9 of the present disclosure.

The camera lens assembly according to embodiment 9 of the present disclosure is described below with reference to FIG. 17 to FIG. 18D. FIG. 17 is a schematic structural view illustrating a camera lens assembly according to embodiment 9 of the present disclosure.

As shown in FIG. 17, the camera lens assembly includes four lenses L1 to L4 arranged in sequence from an object side to an image side along an optical axis. The first lens L1 has an object-side surface S1 and an image-side surface S2; the second lens L2 has an object-side surface S3 and an image-side surface S4; the third lens L3 has an object-side surface S5 and an image-side surface S6; and the fourth lens L4 has an object-side surface S7 and an image-side surface S8. Alternatively, the camera lens assembly may further include a filter L5 having an object-side surface S9 and an image-side surface S10. The filter L5 may be a band-pass filter, and its band-pass wavelength λ fluctuates based on the wavelength of a used light source, the long wave cut-off wavelength of the band-pass wavelength λ is 15 nm to 50 nm longer than the longest wavelength of the wavelength of the used light source, the short wave cut-off wavelength of the band-pass wavelength λ is 15 nm to 50 nm shorter than the shortest wavelength of the wavelength of the used light source. In the camera lens assembly of the present embodiment, a diaphragm STO may also be provided to adjust an amount of light entering. Light from an object passes through the surfaces S1 to S10 successively and is finally imaged on the image plane S11.

Table 25 shows half of the diagonal length ImgH of an effective pixel area on the image plane S11, the maximum half field-of-view angle HFOV, the total effective focal length f, the effective focal lengths f1 to f4 of lenses and the distance TTL from the first lens L1 to the image plane S11 on the optical axis of the camera lens assembly in embodiment 9. Table 26 shows the surface type, the radius of curvature, the thickness, the material and the conic coefficient of each lens of the camera lens assembly in embodiment 9, wherein the unit for the radius of curvature and the thickness is millimeter (mm). Table 27 shows higher-order coefficients $A_4, A_6, A_8, A_{10}, A_{12}, A_{14}, A_{16}$ applicable to each aspheric mirror surface S1 to S8 in embodiment 9. Here, the respective aspheric surface type may be defined by the formula 1) given in the above embodiment 1.

Figure 18A:
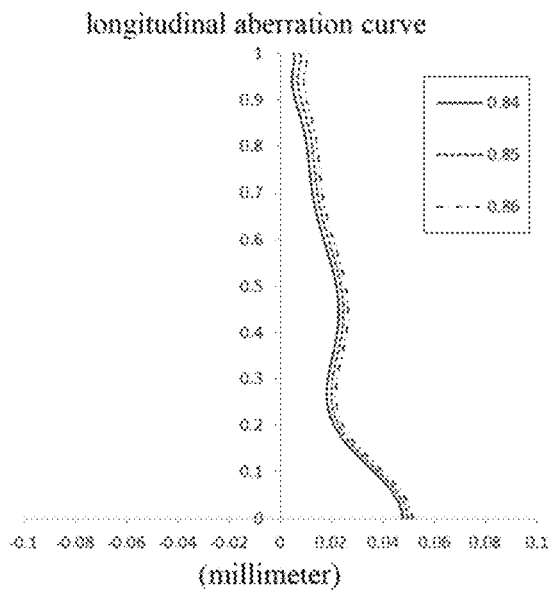
FIG. 18A illustrates a longitudinal aberration curve of the camera lens assembly according to embodiment 9.
Figure 18B:
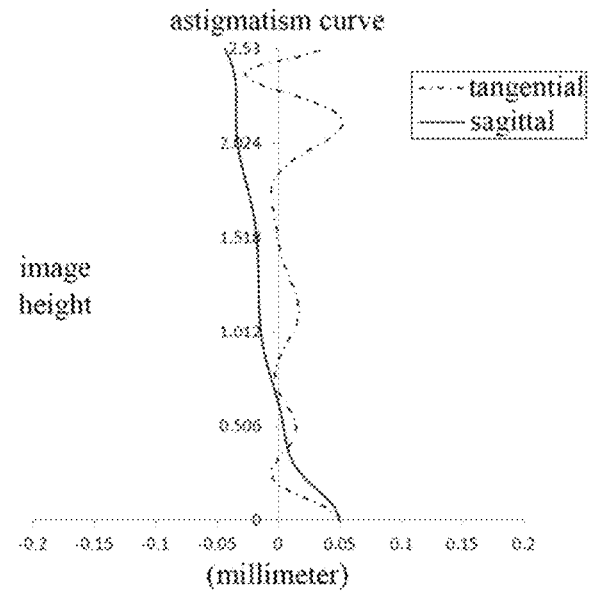
FIG. 18B illustrates an astigmatism curve of the camera lens assembly according to embodiment 9.
Figure 18C:
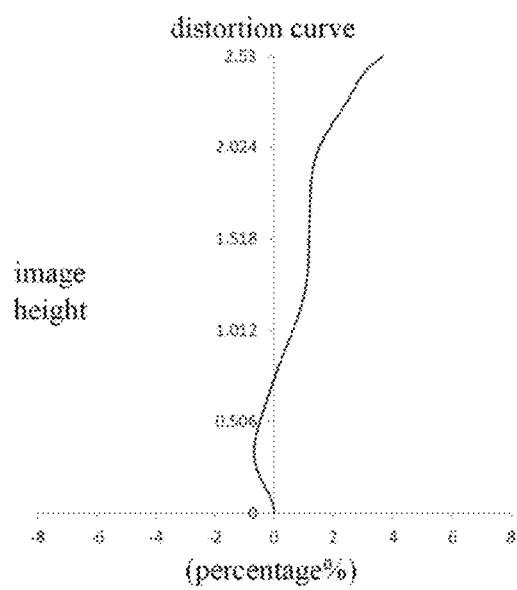
FIG. 18C illustrates a distortion curve of the camera lens assembly according to embodiment 9.
Figure 18D:
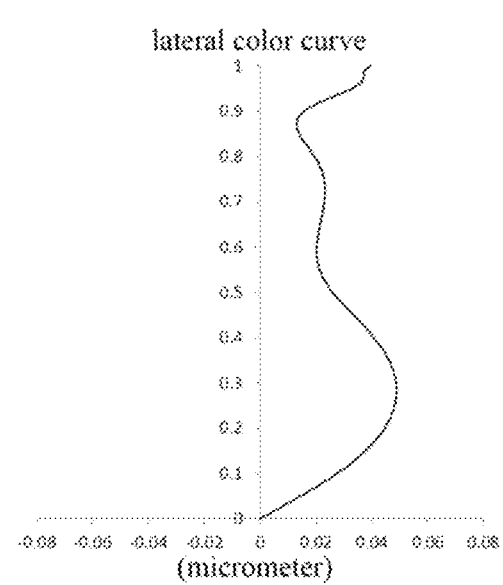
FIG. 18D illustrates a lateral color curve of the camera lens assembly according to embodiment 9.

FIG. 18A shows a longitudinal aberration curve of the camera lens assembly according to embodiment 9, representing deviations of focal points of light in different wavelengths converged after passing through the optical system. FIG. 18B shows an astigmatism curve of the camera lens assembly according to embodiment 9, representing a curvature of a tangential plane and a curvature of a sagittal plane. FIG. 18C shows a distortion curve of the camera lens assembly according to embodiment 9, representing amounts of distortion at different viewing angles. FIG. 18D shows a lateral color curve of the camera lens assembly according to embodiment 9, representing deviations of different image heights on an image plane after light passes through the camera lens assembly. It can be seen from FIG. 18A to FIG. 18D that the camera lens assembly according to Embodiment 9 can achieve good image quality.

In summary, embodiment 1 to embodiment 9 respectively satisfy relationships shown in Table 28 below.

TABLE 25

| Parameter | | | | | | | |
|---|---|---|---|---|---|---|---|
| ImgH (mm) | HFOV (deg) | f (mm) | f1 (mm) | f2 (mm) | f3 (mm) | f4 (mm) | TTL (mm) |
| Value 2.530 | 36.497 | 3.319 | 3.892 | −6.802 | −3.057 | 1.739 | 4.385 |

TABLE 26

| Surface number | Surface type | Radius of curvature | Thickness | Material Refraction index | Abbe number | Conic coefficient |
|---|---|---|---|---|---|---|
| OBJ | spherical | infinite | 400.0000 | | | |
| STO | spherical | infinite | −0.2800 | | | |
| S1 | aspheric | 1.9085 | 0.5908 | 1.640 | 23.53 | −0.3608 |
| S2 | aspheric | 8.0140 | 0.6523 | | | −60.0000 |
| S3 | aspheric | −3.1097 | 0.2700 | 1.535 | 55.78 | −5.2606 |
| S4 | aspheric | −23.9443 | 0.2882 | | | −17.3564 |
| S5 | aspheric | −9.9237 | 0.2895 | 1.535 | 55.78 | 0.0000 |
| S6 | aspheric | 1.9457 | 0.1353 | | | −95.0000 |
| S7 | aspheric | 0.6603 | 0.7254 | 1.535 | 55.78 | −4.9026 |
| S8 | aspheric | 1.4615 | 0.3641 | | | −0.7515 |
| S9 | spherical | infinite | 0.2100 | 1.517 | 64.17 | |
| S10 | spherical | infinite | 0.8594 | | | |
| S11 | spherical | infinite | | | | |

TABLE 27

| Surface number | A4 | A6 | A8 | A10 | A12 | A14 | A16 |
|---|---|---|---|---|---|---|---|
| S1 | −1.8137E−03 | 1.0092E−02 | −2.0972E−02 | 6.5704E−03 | −1.4263E−02 | 2.1342E−02 | −1.2545E−02 |
| S2 | −1.9154E−03 | −2.6282E−02 | −9.0119E−03 | 7.2867E−03 | −8.2965E−03 | −4.4698E−03 | 2.7828E−03 |
| S3 | −2.1952E−01 | 1.0509E−01 | −1.6730E−01 | 1.6458E−01 | −3.9701E−02 | −3.1172E−02 | 9.1994E−03 |
| S4 | −8.9420E−02 | −3.3448E−02 | −1.1242E−01 | 2.4532E−01 | −1.9578E−01 | 6.4384E−02 | −7.6099E−03 |
| S5 | 1.5869E−01 | −2.8108E−01 | 3.4180E−01 | −4.5490E−01 | 3.0531E−01 | −1.1282E−01 | 1.9620E−02 |
| S6 | −7.8754E−01 | 1.7786E+00 | −2.8077E+00 | 2.9692E+00 | −2.0503E+00 | 8.0429E−01 | −1.3033E−01 |
| S7 | −7.5900E−02 | 3.3650E−03 | −7.7253E−02 | 8.5256E−02 | −3.5740E−02 | 6.7985E−03 | −4.9221E−04 |
| S8 | −7.7146E−02 | −1.3473E−01 | 1.2801E−01 | −6.0899E−02 | 1.6554E−02 | −2.4183E−03 | 1.4553E−04 |

TABLE 28

| Formula | Embodiment | | | | | | | | |
|---|---|---|---|---|---|---|---|---|---|
| | 1 | 2 | 3 | 4 | 5 | 6 | 7 | 8 | 9 |
| f/EPD | 1.595 | 1.600 | 1.500 | 1.550 | 1.588 | 1.581 | 1.581 | 1.581 | 1.581 |
| f1/f | 1.673 | 1.672 | 1.574 | 1.752 | 1.870 | 1.188 | 1.191 | 1.161 | 1.172 |
| CT2*100/ΣCT | 13.966 | 15.924 | 14.268 | 13.662 | 14.447 | 14.601 | 13.437 | 13.374 | 14.395 |
| CT2/CT3 | 0.516 | 0.629 | 0.728 | 0.637 | 0.580 | 0.769 | 0.600 | 0.767 | 0.933 |
| ΣCT/TTL | 0.441 | 0.429 | 0.432 | 0.451 | 0.426 | 0.422 | 0.458 | 0.460 | 0.428 |
| (CT2 + CT3)/CT4 | 1.402 | 1.561 | 1.089 | 1.067 | 1.207 | 0.972 | 1.100 | 0.820 | 0.771 |
| DT11/DT22 | 1.011 | 0.972 | 0.941 | 1.041 | 0.939 | 0.847 | 0.965 | 0.938 | 0.850 |
| SAG31/SAG32 | 0.580 | 0.610 | 0.776 | 0.707 | 0.636 | 0.819 | 0.577 | 0.803 | 0.997 |
| ImgH/f | 0.762 | 0.761 | 0.762 | 0.753 | 0.791 | 0.762 | 0.762 | 0.762 | 0.762 |

The present disclosure also provides a camera device, and a photosensitive element of the camera device may be a charged coupled device (CCD) or a complementary metal-oxide semiconductor (CMOS). The camera device may be an independent camera device such as a rangefinder camera, or a camera module integrated on such as a rangefinder device. The camera device is equipped with the camera lens assembly as described above.

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, the camera lens assembly along an optical axis from an object side to an image side sequentially comprising: a first lens, a second lens, a third lens and a fourth lens, a number of lenses in the camera lens assembly being four;
    wherein, the first lens has a positive refractive power, and an image-side surface of the first lens is a concave surface;
    the fourth lens has a positive refractive power, and an object-side surface of the fourth lens is a convex surface;
    a filter is disposed between the fourth lens and the image side, the filter is a band-pass filter, a band-pass wavelength λ of the band-pass filter is determined based on a wavelength of a used light source, a long wave cut-off wavelength of the band-pass wavelength λ is 15 nm to 50 nm longer than a longest wavelength of the wavelength of the used light source, and a short wave cut-off wavelength of the band-pass wavelength λ is 15 nm to 50 nm shorter than a shortest wavelength of the wavelength of the used light source;
    the camera lens assembly having a total effective focal length f and an entrance pupil diameter EPD, wherein the total effective focal length f and the entrance pupil diameter EPD satisfy: 1.5≤f/EPD≤1.6;
    an effective focal length f1 of the first lens and the total effective focal length f of the camera lens assembly satisfies: 1<f1/f<1.9; and
    a center thickness CT2 of the second lens on the optical axis, a center thickness CT3 of the third lens on the optical axis and a center thickness CT4 of the fourth lens on the optical axis satisfy: 1.207≤(CT2+CT3)/CT4<1.6 and 0.5<CT2/CT3<1.

2. The camera lens assembly according to claim 1, wherein a sum of a center thickness ΣCT of the first to fourth lenses on the optical axis, and a distance TTL from the first lens to an image plane on the optical axis satisfy: ΣCT/TTL<0.5.

3. The camera lens assembly according to claim 1, wherein a distance SAG31 from an intersection of an object-side surface of the third lens and the optical axis to an effective radius vertex of the object-side surface of the third lens on the optical axis, and a distance SAG32 from an intersection of an image-side surface of the third lens and the optical axis to an effective radius vertex of the image-side surface of the third lens on the optical axis satisfy: 0.5<SAG31/SAG32<1.

4. The camera lens assembly according to claim 1, wherein an effective radius DT11 of an object-side surface of the first lens, and an effective radius DT22 of an image-side surface of the second lens satisfy: 0.7<DT11/DT22<1.2.

5. The camera lens assembly according to claim 1, wherein half of a diagonal length ImgH of an effective pixel area on an image plane of the camera lens assembly, and the total effective focal length f of the camera lens assembly satisfy: ImgH/f<0.8.

6. A camera lens assembly, the camera lens assembly along an optical axis from an object side to an image side sequentially comprising: a first lens, a second lens, a third lens and a fourth lens, a number of lenses in the camera lens assembly being four;
    wherein, the first lens has a positive refractive power, and an image-side surface of the first lens is a concave surface;
    the fourth lens has a positive refractive power, and an object-side surface of the fourth lens is a convex surface;
    a filter is disposed between the fourth lens and the image side, the filter is a band-pass filter, a band-pass wavelength λ of the band-pass filter is determined based on a wavelength of a used light source, a long wave cut-off wavelength of the band-pass wavelength λ is 15 nm to 50 nm longer than a longest wavelength of the wavelength of the used light source, and a short wave cut-off wavelength of the band-pass wavelength λ is 15 nm to 50 nm shorter than a shortest wavelength of the wavelength of the used light source;
    the camera lens assembly having a total effective focal length f and an entrance pupil diameter EPD, wherein the total effective focal length f and the entrance pupil diameter EPD satisfy: 1.5≤f/EPD≤1.6;

a center thickness CT2 of the second lens on the optical axis and a center thickness CT3 of the third lens on the optical axis satisfy: $0.728 \leq CT2/CT3 < 1$; and an effective focal length f1 of the first lens and the total effective focal length f of the camera lens assembly satisfies: $1 < f1/f < 1.9$.

7. A camera lens assembly, the camera lens assembly along an optical axis from an object side to an image side sequentially comprising: a first lens, a second lens, a third lens and a fourth lens, a number of lenses in the camera lens assembly being four;

wherein, the first lens has a positive refractive power, and an image-side surface of the first lens is a concave surface;

the fourth lens has a positive refractive power, and an object-side surface of the fourth lens is a convex surface;

a filter is disposed between the fourth lens and the image side, the filter is a band-pass filter, a band-pass wavelength $\lambda$ of the band-pass filter is determined based on a wavelength of a used light source, a long wave cut-off wavelength of the band-pass wavelength $\lambda$ is 15 nm to 50 nm longer than a longest wavelength of the wavelength of the used light source, and a short wave cut-off wavelength of the band-pass wavelength $\lambda$ is 15 nm to 50 nm shorter than a shortest wavelength of the wavelength of the used light source;

the camera lens assembly having a total effective focal length f and an entrance pupil diameter EPD, wherein the total effective focal length f and the entrance pupil diameter EPD satisfy: $1.5 \leq f/EPD \leq 1.6$;

an effective radius DT11 of an object-side surface of the first lens, and an effective radius DT22 of an image-side surface of the second lens satisfy: $0.7 < DT11/DT22 < 1.2$; and a center thickness CT2 of the second lens on the optical axis, a center thickness CT3 of the third lens on the optical axis and a center thickness CT4 of the fourth lens on the optical axis satisfy: $1.207 \leq (CT2+CT3)/CT4 < 1.6$ and $0.5 < CT2/CT3 < 1$.

* * * * *